US012373539B2

United States Patent
Lal et al.

(10) Patent No.: US 12,373,539 B2
(45) Date of Patent: Jul. 29, 2025

(54) SYSTEMS AND METHODS FOR USING OCCLUDED 3D OBJECTS FOR MIXED REALITY CAPTCHA

(71) Applicant: Adeia Guides Inc., San Jose, CA (US)

(72) Inventors: Dhananjay Lal, Englewood, CO (US); Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 109 days.

(21) Appl. No.: 17/881,311

(22) Filed: Aug. 4, 2022

(65) Prior Publication Data

US 2024/0045942 A1 Feb. 8, 2024

(51) Int. Cl.
*G06F 21/36* (2013.01)
*G06F 3/04815* (2022.01)
*G06T 19/20* (2011.01)

(52) U.S. Cl.
CPC .......... *G06F 21/36* (2013.01); *G06F 3/04815* (2013.01); *G06T 19/20* (2013.01); *G06F 2221/2133* (2013.01); *G06T 2219/2004* (2013.01); *G06T 2219/2016* (2013.01)

(58) Field of Classification Search
CPC ................. G06F 21/36; G06F 3/04815; G06F 2221/2133; G06T 19/20; G06T 2219/2004; G06T 2219/2016
See application file for complete search history.

(56) References Cited

U.S. PATENT DOCUMENTS

| 10,331,945 | B2 | 6/2019 | Piccolotto et al. |
| 10,832,485 | B1 | 11/2020 | Mantri |
| 10,860,705 | B1 | 12/2020 | Ganeshmani |
| 2011/0197268 | A1* | 8/2011 | Ravikumar ............ G06F 21/31 345/426 |

(Continued)

FOREIGN PATENT DOCUMENTS

KR 2021076663 A * 6/2021 ............ G06F 21/36

OTHER PUBLICATIONS

"Pioneers in intuitive motion tracking technology," Sensoryx, Retrieved from https://www.sensoryx.com/, Retrieved on Mar. 21, 2025, 12 pages.

(Continued)

*Primary Examiner* — Richard G Keehn
(74) *Attorney, Agent, or Firm* — Haley Guiliano LLP

(57) ABSTRACT

Systems and methods for generating a CAPTCHA challenge in a virtual environment are disclosed. The methods display a spatially anchored virtual 3D object in a virtual environment where certain features of the 3D object are hidden or occluded. The methods provide general, specific, or no instructions to a user for manipulating the displayed 3D virtual object. Upon determining that the manipulations performed follow the instructions, the occluded feature is revealed. Varying degrees of CAPTCHA challenges are provided that include moving real life objects, leveraging user background in generating customized CAPTCHA challenges, and camouflaging the virtual objects to make solving (Continued)

Stage 1: Starting position

Stage 2: Rotate top face to side face

Stage 4: Ending position

Stage 3: Rotate counterclockwise by one face the CAPTCHA more challenging. The methods query the user to provide an input that reflects the revealed occluded feature, and, if the response to the query meets the predetermined response, access to the secured data requested in granted.

19 Claims, 15 Drawing Sheets

(56) References Cited

U.S. PATENT DOCUMENTS

| | | | | |
|---|---|---|---|---|
| 2012/0166582 | A1* | 6/2012 | Binder | G06F 21/78 |
| | | | | 709/217 |
| 2012/0291122 | A1* | 11/2012 | Chow | G06F 21/36 |
| | | | | 726/19 |
| 2015/0170204 | A1* | 6/2015 | Inbar | G06F 21/36 |
| | | | | 705/14.55 |
| 2016/0300054 | A1 | 10/2016 | Turgeman et al. | |
| 2017/0262623 | A1* | 9/2017 | Plenderleith | G06F 21/36 |
| 2018/0341779 | A1 | 11/2018 | Sawant et al. | |
| 2019/0188371 | A1* | 6/2019 | Shen | G06F 21/36 |
| 2019/0303555 | A1* | 10/2019 | Agarwal | G06F 21/36 |
| 2020/0204541 | A1* | 6/2020 | Nair | G06F 21/36 |
| 2023/0134644 | A1* | 5/2023 | Lorsignol | G06F 21/36 |
| | | | | 726/17 |
| 2024/0012896 | A1* | 1/2024 | Imam | G06F 21/36 |

OTHER PUBLICATIONS

"Vive Hand Tracking SDK Overview, introduction" available online at <https://web.archive.org/web/20231201195227/https://hub.vive.com/storage/tracking/overview/introduction.html>, retrieved on Mar. 21, 2025, 3 pages.

Cochard. D., "Midas : A Machine Learning Model for Depth Estimation," Medium, Retrieved from https://medium.com/axinc-ai/midas-a-machine-learning-model-for-depth-estimation-e96119cc1a3c, May 28, 2021, 14 pages.

Hayden. S., "HTC Announces Wrist Tracker for Vive Focus 3, Releasing in Early 2022 for $129," Road Tovr, Retrieved from https://www.roadtovr.com/htc-vive-wrist-tracker-focus-3-release/, Jan. 5, 2022, 8 pages.

Meta Spark, "Hand & Body Tracking Capabilities Arrive," available online at <https://web.archive.org/web/20230610003237/https://sparkar.facebook.com/blog/new-hand-body-tracking-capabilities-arrive/>, Nov. 8, 2021, 11 pages.

* cited by examiner

SYSTEMS AND METHODS FOR USING OCCLUDED 3D OBJECTS FOR MIXED REALITY CAPTCHA

FIELD OF DISCLOSURE

Embodiments of the present disclosure relate to generating CAPTCHA (Completely Automated Public Turing test to tell Computers and Humans Apart) challenges in a 3D virtual or augmented reality environment to validate and distinguish human activity from machines or bots.

BACKGROUND

Currently, many websites require that evidence of human activity be verified in order to fill out forms or enter an authenticated area. CAPTCHA has been an important tool for protecting websites against bots and automated hacking tools. The principle behind CAPTCHA (Completely Automated Public Turing test to tell Computers and Humans Apart) is that malicious apps are very good at completing forms automatically, but not so good at decoding the text hidden in images.

As web technology has evolved, creators are exploring new ways to offer information to users and solicit information from them. For instance, in the "metaverse" the world is not modeled as a 2D screen in which the user reads information and fills out forms using a keyboard and mouse, but rather as a 3D world in which the user interacts with objects to gather and provide information.

Although some efforts have been made to improve CAPTCHAs in distinguishing between human and bot activity, the current efforts have several drawbacks and lack applications in the metaverse or virtual, augmented, and mixed reality space.

For example, one of the current methods camouflages the CAPTCHA text such that it is not easily discernable, such as by hiding the text behind an image. However, such methods can relatively easily be defeated by automated systems and bots. Artificial intelligence (AI) and machine learning (ML) technologies allow bots to teach themselves how to analyze images and identify the letters hidden in them. They can even accurately identify elements in images, allowing them to circumvent such CAPTCHAs.

In another example, current methods augment a scene received from a user camera using an image. The image may be superimposed on the scene, and the user may be asked to describe the image that is superimposed. Superimposing images on a scene can also be defeated by automated systems and bots. AI and ML technologies allow bots to teach themselves how to analyze images, including superimpositions, to identify the image or the scene.

As such, there is a need for a method for generating a CAPTCHA that can be used in the virtual and metaverse space that overcomes some of the drawbacks of the current methods to further distinguish between human and automated system or bot activity.

BRIEF DESCRIPTION OF THE FIGURES

The various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
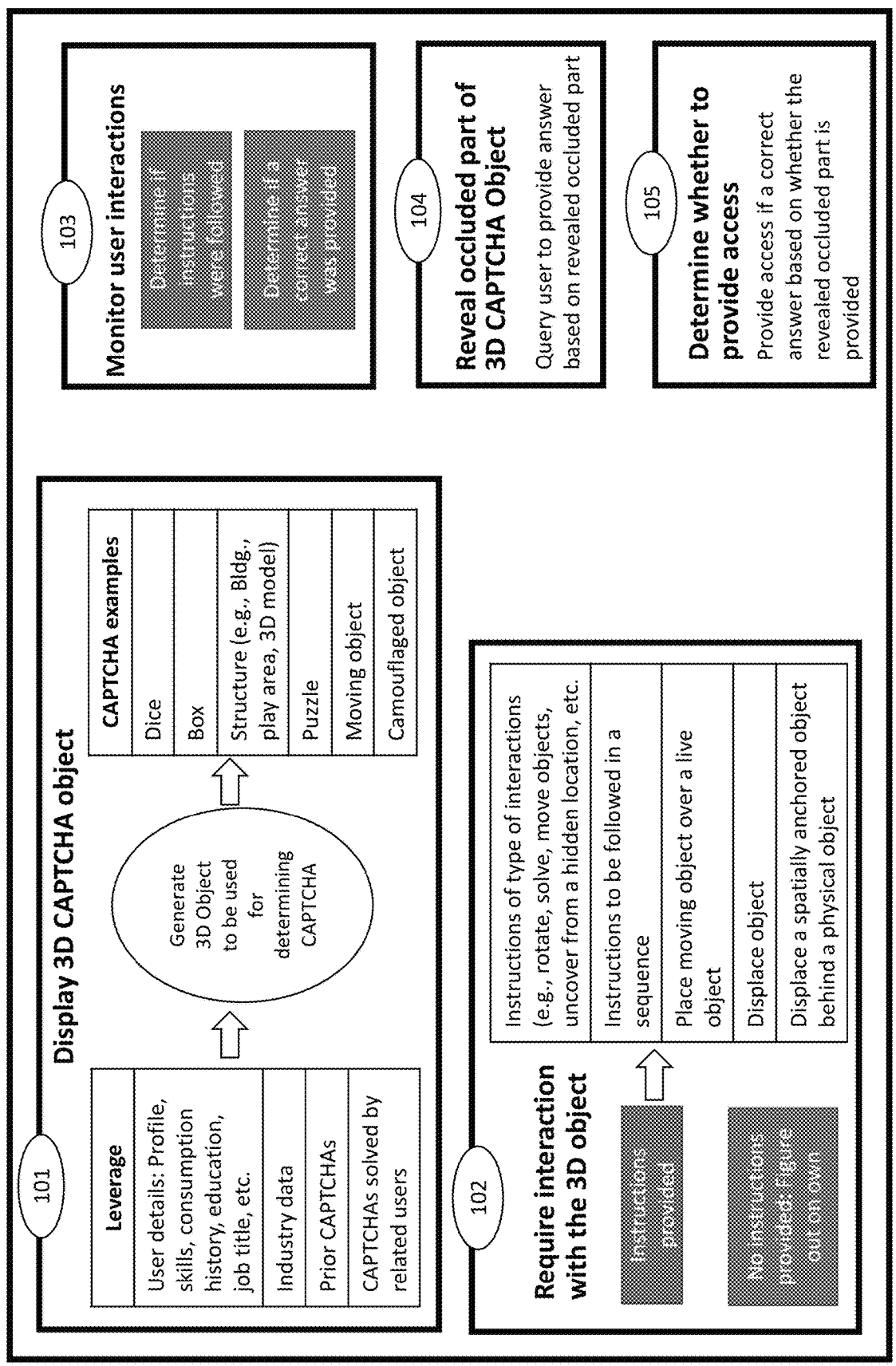
FIG. 1 is a block diagram of an example for generating a CAPTCHA challenge and providing access to requested data based on the completion of the CAPTCHA challenge, in accordance with some embodiments of the disclosure.

In accordance with some embodiments disclosed herein, some of the above-mentioned limitations are overcome by generating CAPTCHA challenges in a 3D virtual environment by using combinations 3D virtual object rendering, spatial anchoring or simultaneous localization and mapping (SLAM), depth estimation, and 6DOF human movement in space to validate human activity and distinguish it from activity of machines or bots.

In some embodiments, the systems and methods described herein are used to generate CAPTCHA challenges, display 3D virtual objects as part of the CAPTCHA challenges, spatially anchor the 3D virtual objects displayed, detect user interactions with the 3D virtual objects displayed, monitor user movements in relation to the 3D virtual objects displayed, resize the 3D virtual objects, occlude or hide features and elements of the 3D virtual objects, reveal occluded elements and features of the 3D virtual objects, query users for answers to revealed occluded features of the 3D virtual objects, and determine whether to grant access to the requested secured data based on the answers provided.

To accomplish some of these embodiments, a 3D CAPTCHA challenge is displayed on an electronic device. The 3D CAPTCHA challenge may be displayed in response to an electronic device seeking access to certain data, such as access to a website, forms, or a secured database. In order to provide the access to the secured data, the content provider, owner of the secured data, or the platform/channel may require the user to enter a user ID and a password for authenticating the user prior to providing the requested access. However, since bots and automated systems may hack a user ID and password, as an extra layer of protection and to distinguish a human attempt from a bot attempt, the CAPTCHA challenge is provided in a 3D space.

In some embodiments, electronic devices such as a mobile phone; a virtual, augmented, or mixed reality headset; smart glasses; or metaverse equipment may be used by the user to access the secured data. The CAPTCHA challenge generated on the electronic device may include generating a virtual object that includes hidden or occluded features. In some embodiments, the methods may analyze the user background or consumption history to generate a customized virtual object.

As part of the CAPTCHA challenge, a general or specific instruction may be provided to the user that guides the user in how to manipulate the displayed 3D object to gain access to the hidden/occluded feature. The instructions may require the user to rotate the 3D object, solve a challenge posed by the 3D object, move the 3D object, walk around the 3D object in the virtual space, shake the virtual object or provide a shaking effect, or uncover the occluded feature from a hidden location. The instructions may also require a user to move about the 3D virtual object with respect to the environment, such as another object or a 3D origin. The instructions may also require a user to change their field of view (FOV) or perspective of the 3D object within the virtual environment.

Whether general or specific, the instructions may be visual, textual, or auditory. Visual instructions may include graphics, images, pointers, such as arrows, or animated GIFs. Textual instructions may appear at any location on a display of the electronic device used, including in a pop-up window. Auditory instructions may vary tones or volume, such as lower to higher decibels; may be provided in different ears of the user; or may be split up by providing some portions in one ear and other portions in the other ear of the user when the user is wearing a headset or earbuds that have a speaker in each ear. In some embodiments, no instructions may be provided, and the user may need to use their own skill and judgement to uncover the occluded feature.

When instructions are provided, the system may monitor the user's interactions with the 3D virtual object to determine if the user's interactions follow or match the provided instructions. Such monitoring may involve analyzing all six degrees of freedom (6DOF) of the user and determining whether each movement and interaction with the virtual 3D object follows the provided instructions.

If a determination is made that the instructions were followed, then the occluded feature may be revealed, and the system may query the user to provide details or an answer that can only be provided upon viewing the occluded feature. If the response to the query matches a predetermined response, then access to the secured data may be provided.

FIG. 1 is a block diagram of an example for generating a CAPTCHA challenge and providing access to requested data based on the completion of the CAPTCHA challenge, in accordance with some embodiments of the disclosure.

In some embodiments, at block 101, a 3D CAPTCHA challenge is displayed on an electronic device. In some embodiments, CAPTCHA is presented in a 3D environment.

In some embodiments, a user of the electronic device may request access to certain data, such as access to a website, documents or images in a secured database, media assets or subscriptions provided by a service, video games or any other online or secured content. The user may also request access to an event, such as physical event or a virtual event. These events may include seminars, virtual media assets, live events such as live sports games, concerts, seminars, virtual gaming environments, and the like. The user may also be requesting access to financial data, such as banking data; stock market information; financial or trading accounts; virtual currency platforms; or metaverse venues. The above-mentioned websites, games, media assets, subscriptions, events (live or virtual), metaverse spaces, and others are herein referred to as requesting access to data.

Regardless of what type of data or event to which access is requested by the user, in order to provide access to such data, the provider or owner of the content, or the platform and channel, may require the user to enter a user ID and a password for authenticating the user prior to providing the requested access. Since hacking, electronic fraud, and cyber security crimes are on the rise, where automated systems breach the account security and gain access to the data by having a machine try numerous numbers of user IDs and passwords to gain access to the data, relying on the user ID and password alone to provide access may not secure against such breaches by automated systems. As such, the current embodiments use CAPTCHA challenges in a 3D space to distinguish between the machine and a real human user and provide the additional needed cyber security.

In some embodiments, the user may be using the portable electronic device to access data. The portable device may be a mixed reality, augmented reality, or virtual reality device that includes a camera and a display to obtain and display the physical or live images, virtual images, or virtual images overlayed in the virtual environment over a physical surface. In another embodiment, the electronic device may be a wearable device, such as smart glasses with control circuitry that allows the user to see through a transparent glass to view the real physical or live images as well as overlay them with virtual objects.

In yet another embodiment, the portable electronic device may be a mobile phone having a camera and a display to intake the live feed input and display it on a display screen of the mobile device. The live feed may be a feed that is seen through the portable electronic device, such as the mobile phone or a headset of a virtual reality, augmented reality, or mixed reality system. The live feed seen through a mobile phone may be through its outward-facing camera that allows its user to see a live image within the camera's field of view.

The devices mentioned may, in some embodiments, include both an inward-facing camera and an outward-facing camera. The front-facing or inward-facing camera may be directed at the user of the device while the outward-facing camera may capture the live images in its field of view. The devices mentioned above may also include smart glasses, a mobile phone, a virtual reality headset, and the like that are capable of providing virtual, augmented, and mixed reality environments and displaying virtual objects as well as live imagery.

At block 101, in response to a user requesting access to data, in some embodiments, the control circuitry, such as control circuitry 228 or 220 of system 200 (FIG. 2), may generate a CAPTCHA in a 3D environment. In some embodiments, the CAPTCHA may comprise a random virtual object. The control circuitry 228 or 220 may leverage user details, industry data, prior CAPTCHAs, and CAPTCHAs resolved by related users to customize the virtual object as part of the CAPTCHA challenge.

In some embodiments, the user's details such as their profile, skill sets, consumption history, education or job title may be leveraged. In some instances, the control circuitry may utilize an artificial intelligence (AI) engine running an AI algorithm to leverage the user's details. For example, an AI engine running an AI algorithm may determine the user's proficiency or skill level pertaining to a particular subject and use that in displaying a customized 3D CAPTCHA virtual object that is based upon the user's proficiency or skill level. For example, the control circuitry may determine that the user is an engineer and has several years of experience in semiconductor technologies. Accordingly, the control circuitry may generate a 3D CAPTCHA object that someone who possesses the knowledge of electrical engineering and specifically semiconductors may be able to solve, and which may not be easily solved by a machine. For example, the control circuitry may display a circuit board and display a plurality of 3D virtual objects that are electrical components that may be placed on a circuit board that is used for a specific type of semiconductor use and ask the user to move the electrical components to their correct locations on the circuit board for it to be operational. Once such a task is correctly handled, the control circuitry may reveal the flow of an electrical current, which is initially occluded, and then ask the user to provide an answer on the direction of the current, which can be ascertained only after the user solves the 3D CAPTCHA.

Likewise, other user data, such as education, job title, date related to company at which the user works, personal data, or profile data may also be leveraged in generating customized 3D CAPTCHA objects.

Some examples of types of virtual objects generated as part of the CAPTCHA include a 3D die; a 3D box; a 3D structure, such as a building, play area, or a model; a 3D puzzle; a moving object either by itself or overlayed on a physical live image; and a camouflaged 3D object. Although some examples of 3D objects have been described above, the embodiments are not so limited, and other 3D objects are also contemplated.

In some embodiments, the 3D object depicted as part of the CAPTCHA includes an occluded feature. An occluded feature is a feature that is hidden and not disclosed at the first instance. For example, when a die is displayed, the occluded feature may be a face of the die that is hidden and not displayed initially. As displayed in FIG. 8 (at stage 1) the die may initially show three of its faces that include the numbers 5, 6, and 3. All the other numbers on the dice may be occluded until a user interacts with the dice. For example, faces that include numbers 1, 2, and 4 may be initially occluded.

In another example, the 3D object depicted as part of the CAPTCHA may be a box. In this example, the occluded feature may be inside the box and thus is hidden. The occluded feature may not be revealed until a user performs an interaction with the box, such as opening the box.

In another example, the 3D object depicted as part of the CAPTCHA may be a structure. In this example, the occluded feature maybe hidden in a particular room of the structure or underneath a structural element and may only be revealed to the user once the user walks around the structure in the 3D environment and discovers the occluded feature. Although some examples of occluded features are described above, the embodiments are not so limited and any type of occlusion of a 3D object such that the occluded feature is not initially visible is also contemplated.

At block 102, in one environment, interactions with the 3D object may be required to unveil or reveal the occluded feature of the 3D object. In some embodiments, the control circuitry may provide instructions to the user of the type of interactions the user needs to perform in order to reveal the occluded feature. For example, the instructions may require the user to rotate the 3D object, solve a challenge posed by the 3D object, move the 3D object, or uncover the occluded feature from a hidden location.

In some embodiments, in addition to providing instructions on how to interact with the display 3D virtual object, the control circuitry may also require the user to follow the instructions in a particular sequence. For example, the control circuitry may require the user to rotate the dice clockwise to the right as an initial step, and subsequently rotate the dice from top to bottom as a sequential step following the initial step. In another example, the control circuitry may require an avatar of the user to walk to a particular location in a virtual structure displayed in an augmented reality environment, and subsequently open a particular door and pass through the door as a sequential step.

In some embodiments, the control circuitry, as part of the instructions provided, may require the user to place a moving object over a live object that is viewed through the electronic device. For example, in the instance where the user is wearing a virtual reality headset or a pair of smart glasses through which live imagery can be viewed in real time, the control circuitry may display a virtual 3D object within the 3D virtual environment of the headset or the eyeglasses. As part of the instructions, the control circuitry may require the user to displace the virtual 3D object such that it is overlayed over a live object. In other embodiments, the control circuitry may instruct the user to displace a 3D virtual object within a virtual environment to a desired location.

In some embodiments, the control circuitry may displace an artifact, such as a painting or another object, from a location and require the user to manipulate the object and place it back in a location where it belongs. For example, the control circuitry may displace a painting in a museum from a wall and make it appear as a 3D virtual object. In this instance, the virtual circuitry may instruct the user to displace the painting and place it back in a frame from where it was originally displaced. The control circuitry may also perform a variety of other displacements and manipulations to the 3D virtual object. For example, it may virtually dismember a body part of a sculpture, such as its arm, and it may also enlarge the arm to a disproportionate size. The control circuitry may then instruct the user to displace the dismembered body part and resize it such that it fits the sculpture in the correct location and is size appropriate.

The instructions provided may be in a textual, visual, and/or auditory format. For example, a tone may be provided in a right ear of a user to make certain manipulations or displacements with respect to the virtual 3D object, and another set of instructions may be provided in the left ear. Varying auditory instructions, for example, providing audio for some of the instructions in one ear and the rest in another ear, may further ensure that the user is an individual and not a machine, since such auditory instructions may not be understood or followed by a machine. In another example, textual or visual instructions may accompany the different auditory instructions provided to the left and right ear, and the textual or visual instructions may indicate which auditory instructions to follow in a particular order. For example, the textual instructions may indicate, listen to the instructions provided in your left ear. In another example, the textual instructions may be partial instructions and instruction the user to follow the remainder of the instructions provided in auditory format, e.g., place the object in one of the two boxes, listen to the auditory instructions to select one of the two boxes.

At block 102, in another embodiment, the control circuitry may display a 3D object and ask the user to solve a challenge posed by the 3D object or provide an answer related to the 3D object. In this embodiment, the control circuitry may ask the user to solve the 3D challenge without providing any instructions. Only once the challenge is correctly solved may the control circuitry then unveil the occluded feature of the 3D object.

At block 103, the control circuitry may monitor the user's interactions. In the embodiments where specific instructions are provided for the types of movements or the type of sequence that the user is required to follow to unveil the occluded feature, the monitoring may involve determining whether each movement and interaction with the virtual 3D object follows the provided instructions. Accordingly, the monitoring may include analyzing all 6DOF of the user and determine if the motions follow the instructions. In order to monitor such movements, the control circuitry may utilize a plurality of hardware components associated with or communicatively coupled to the electronic device. For example, such hardware components may include a gyroscope, an accelerometer, inertial sensors, vibration sensors, and/or motion sensors. Using such hardware or external components, in some embodiments, require permission of the user to grant access to the system. In such instances, the system may seek and obtain access prior to accessing external components, such as a wearable device worn by the user. In order to use such hardware or external components, the control circuitry may determine which hardware or external component is available and which hardware or external component can be utilized to obtain the data needed. It may then execute instructions to activate such hardware or external component and access data from it.

In another embodiment, where specific instructions relating to the movements or motions to be performed are not provided, the monitoring may determine whether the user on their own was able to solve the CAPTCHA challenge based on the 3D object displayed. For example, the control circuitry may display two dice as virtual objects and display one side of the dice having a specific number, such as die 1 showing a number 3 and die 2 showing a number 4. The control circuitry may provide a total sum of the dice, such as a number 9. The user, without any instructions provided by the control circuitry and based on their own skill may perform interactions with both dice such that the two faces of the dice showing, e.g., die 1 showing a number 5 and die 2 showing a number 4, summed up together equals the answer 9 provided.

At block 104, depending on the outcome of block 103, the control circuitry may reveal the occluded part of the 3D CAPTCHA object. For example, if instructions are provided at block 102, and if a determination is made at block 103 that the instructions were followed, then at block 104 the control circuitry may reveal the occluded part of the 3D CAPTCHA object. Likewise, if a determination is made at block 103 that the user has provided a correct answer relating to the 3D CAPTCHA object when no instructions are provided, then at block 104 the control circuitry may reveal the occluded part of the 3D CAPTCHA object.

At block 104, the control circuitry may query the user to provide an answer based on the revealed occluded part of the 3D CAPTCHA object. For example, the control circuitry may query the user to find out what was inside a hidden box, what face of the dice is currently being displayed, what is behind a particular structure, or what object is camouflaged. The queries may vary depending on the type of CAPTCHA challenge, and the examples provided above are not so limited.

At block 105, a determination is made whether to provide access to the requested material. If a correct answer is provided to the query post in block 104, then, at block 105, access to the requested information may be provided. On the other hand, if the response to the query results in an inaccurate answer, then the access may be denied.

In the event of an incorrect answer to the CAPTCHA challenge, in some embodiments, the control circuitry may allow more than one attempt to solve the CAPTCHA challenge. The control circuitry may utilize a counter to determine the number of attempts made and determine if the number has reached a predetermined number of attempts allowed. Such number of attempts may be predetermined by the control circuitry.

As described above, the embodiments of blocks 101-105 are performed to authenticate that a user is attempting to gain access to a secured site or secured data rather than a machine, a bot, a computer, or another form of automated system. As such, a 3D CAPTCHA challenge in a virtual, augmented, or mixed reality environment is provided and tested to distinguish a user from an automated system.

In some embodiments, the 3D CAPTCHA challenge is generated in response to receiving a request from an electronic device for secured access. The CAPTCHA challenge includes displaying a 3D virtual object having an occluded element. The occluded element or feature is an element or feature that is initially hidden when the 3D object is displayed. For example, the occluded feature may be on an opposite side of the 3D object which is not in line of sight via the electronic device or may be hidden in a box or in some other location that is not initially visible.

In some embodiments, the 3D virtual object may be spatially anchored to an object in either a virtual or real environment. Spatial anchoring may include using a 3D coordinate system in the virtual or real environment, such as locating the 3D coordinate origin at a virtual or real object in the virtual or real environment and associating the 3D virtual object with the 3D coordinate system. For example, if a 3D coordinate original is selected to be a corner of a room as visible in the field of view of a virtual reality headset, where the room is a real-life room, then a 3D virtual die displayed at certain X, Y, Z coordinates is said to be anchored from the origin of the 3D coordinate system, i.e., the corner of the room. In other words, the location of the 3D virtual object is measured in the 3D coordinate system by using the corner of the room as the origin of the 3D coordinate system. Likewise, the 3D virtual object may also be spatially anchored to another virtual object in the virtual environment, instead of being spatially anchored to a real-life object. In such embodiments, the location of the 3D virtual object is measured in the 3D coordinate system by using the virtual object in the virtual environment as the origin of the 3D coordinate system.

In some embodiments, the control circuitry may deliver instructions, via the electronic device, to the user on how to interact with the displayed 3D virtual object. The instructions provided may require the user to interact with and manipulate the 3D object. Such interactions and manipulations may require the user to alter orientations of the object with respect to the environment, and/or to alter perspectives of the object from the view of the user (e.g., a user can move around the object within the virtual environment).

In some embodiments, the instructions may require specific interactions, and in other embodiments, the instructions may be more general such that a variety of different interactions or manipulations could reveal the occluded element. For example, instructions with specific interactions may include something like "Rotate the object right and then remove a cover," whereas more general instructions may say something like "Count the total number of dots on the die faces."

The control circuitry may determine if the instructions were followed. For example, in some embodiments, to satisfy the instructions, the user may be required to move the 3D object, orient it with respect to the environment, and change the field of view (FOV) or perspective of the object within the environment. Other instructions, as described above, may require the user to move about with 6DOF in a particular sequence.

Once the user follows the instructions, or in some embodiments, figures out the CAPTCHA on their own without any instructions, then control circuitry may reveal the occluded element or feature of the 3D virtual object.

Although the concepts discussed above in reference to FIG. 1 describe the revealing of the occluded feature, other methods such as unveiling the hidden feature or element, or another method of disclosing the hidden feature or element are also contemplated.

Once the occluded feature is revealed, the control circuitry may query the user for an answer or description of the revealed feature. For example, the control circuitry may ask the user to input a number that is displayed on the revealed side of a dice, or the contents revealed from inside a box. In some embodiments, once a correct answer to the query is provided, the control circuitry may provide the secured access to the user.

Figure 2:
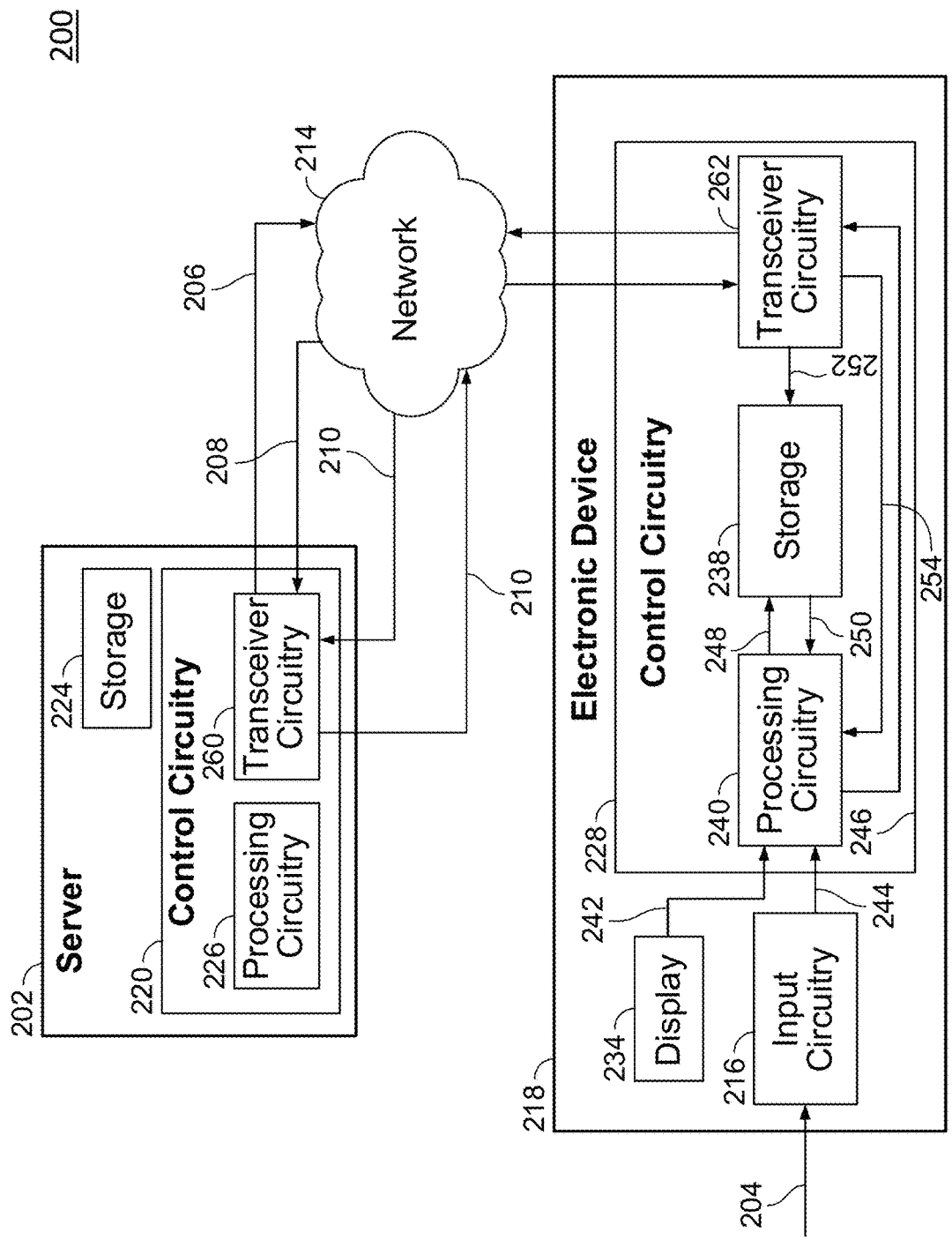
FIG. 2 is a block diagram of an example system for generating a CAPTCHA challenge and providing access to requested data based on the completion of the CAPTCHA challenge, in accordance with some embodiments of the disclosure.
Figure 3:
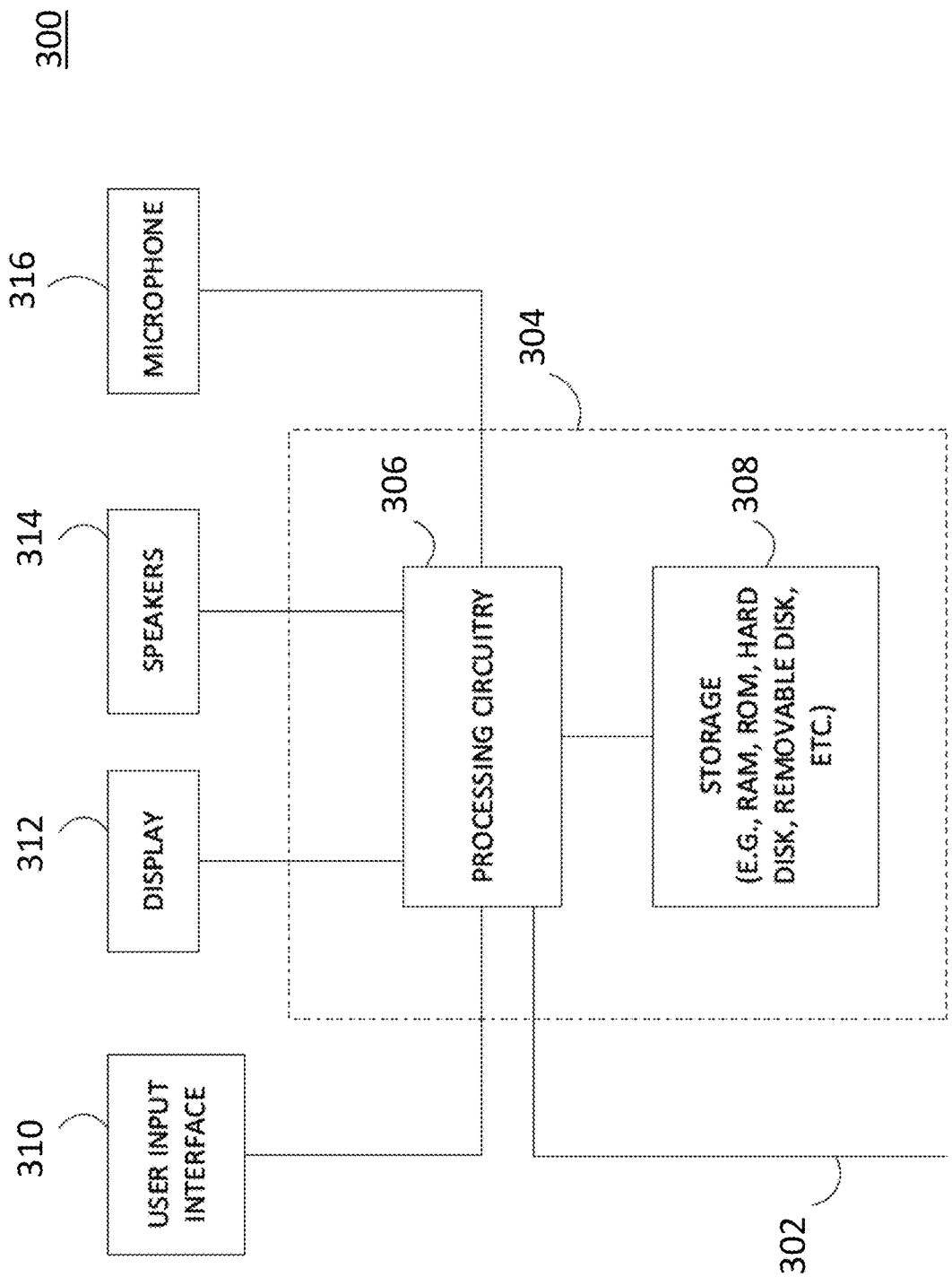
FIG. 3 is a block diagram of an electronic device for generating a CAPTCHA challenge and determining access to requested data based on the completion of the CAPTCHA challenge, in accordance with some embodiments of the disclosure.

FIG. 2 is a block diagram of an example system for generating a CAPTCHA challenge and determining access to requested data based on the completion of the CAPTCHA challenge, in accordance with some embodiments of the disclosure and FIG. 3 is a block diagram of an electronic device used in the CAPTCHA challenge, in accordance with some embodiments of the disclosure.

FIGS. 2 and 3 also describe example devices, systems, servers, and related hardware that may be used to implement processes, functions, and functionalities described in relation to FIGS. 1, and 4-14. Further, FIGS. 2 and 3 may also be used for generating CAPTCHA challenges, displaying 3D virtual object, spatially anchoring the 3D virtual objects, detecting user interactions with 3D virtual objects displayed as part of the CAPTCHA challenge, monitoring user movements in relation to the 3D virtual objects displayed, resizing 3D virtual objects, occluding or hiding features and elements of the 3D virtual object, revealing occluded elements and features of the 3D virtual object, querying user for answers to releveled occluded feature of the 3D virtual object, determining whether to grant access to the requested secured data, accessing user's data, such as profiles, re-rendering the 3D virtual object based on user interactions and performing functions related to all other processes and features described herein.

In some embodiments, one or more parts of, or the entirety of system 200, may be configured as a system implementing various features, processes, functionalities and components of FIGS. 1, and 4-14. Although FIG. 2 shows a certain number of components, in various examples, system 200 may include fewer than the illustrated number of components and/or multiples of one or more of the illustrated number of components.

System 200 is shown to include a computing device 218, a server 202 and a communication network 214. It is understood that while a single instance of a component may be shown and described relative to FIG. 2, additional instances of the component may be employed. For example, server 202 may include, or may be incorporated in, more than one server. Similarly, communication network 214 may include, or may be incorporated in, more than one communication network. Server 202 is shown communicatively coupled to computing device 218 through communication network 214. While not shown in FIG. 2, server 202 may be directly communicatively coupled to computing device 218, for example, in a system absent or bypassing communication network 214.

Communication network 214 may comprise one or more network systems, such as, without limitation, an internet, LAN, WIFI or other network systems suitable for audio processing applications. In some embodiments, system 200 excludes server 202, and functionality that would otherwise be implemented by server 202 is instead implemented by other components of system 200, such as one or more components of communication network 214. In still other embodiments, server 202 works in conjunction with one or more components of communication network 214 to implement certain functionality described herein in a distributed or cooperative manner. Similarly, in some embodiments, system 200 excludes computing device 218, and functionality that would otherwise be implemented by computing device 218 is instead implemented by other components of system 200, such as one or more components of communication network 214 or server 202 or a combination. In still other embodiments, computing device 218 works in conjunction with one or more components of communication network 214 or server 202 to implement certain functionality described herein in a distributed or cooperative manner.

Computing device 218 includes control circuitry 228, display 234 and input circuitry 216. Control circuitry 228 in turn includes transceiver circuitry 262, storage 238 and processing circuitry 240. In some embodiments, computing device 218 or control circuitry 228 may be configured as electronic device 300 of FIG. 3.

Server 202 includes control circuitry 220 and storage 224. Each of storages 224 and 238 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 224, 238 may be used to store various types of content, metadata, and or other types of data (e.g., they can be used to store CAPTCHA challenges, virtual 3D objects, occluded elements of the virtual 3D objects, user movements and interactions as related to the manipulation of the virtual 3D object, attempts made by user in solving a CAPTCHA challenge, user profiles, user consumption history, user background and education history, and AI and ML algorithms). Non-volatile memory may also be used (e.g., to launch a boot-up routine and other instructions). Cloud-based storage may be used to supplement storages 224, 238 or instead of storages 224, 238. In some embodiments, data relating to CAPTCHA challenges, virtual 3D objects, occluded elements of the virtual 3D objects, user movements and interactions as related to the manipulation of the virtual 3D object, attempts made by user in solving a CAPTCHA challenge, user profiles, user consumption history, user background and education history, and AI and ML algorithms, and data relating to all other processes and features described herein, may be recorded and stored in one or more of storages 212, 238.

In some embodiments, control circuitry 220 and/or 228 executes instructions for an application stored in memory (e.g., storage 224 and/or storage 238). Specifically, control circuitry 220 and/or 228 may be instructed by the application to perform the functions discussed herein. In some implementations, any action performed by control circuitry 220 and/or 228 may be based on instructions received from the application. For example, the application may be implemented as software or a set of executable instructions that may be stored in storage 224 and/or 238 and executed by control circuitry 220 and/or 228. In some embodiments, the application may be a client/server application where only a client application resides on computing device 218, and a server application resides on server 202.

The application may be implemented using any suitable architecture. For example, it may be a stand-alone application wholly implemented on computing device 218. In such an approach, instructions for the application are stored locally (e.g., in storage 238), and data for use by the application is downloaded on a periodic basis (e.g., from an out-of-band feed, from an internet resource, or using another suitable approach). Control circuitry 228 may retrieve instructions for the application from storage 238 and process the instructions to perform the functionality described herein. Based on the processed instructions, control circuitry 228 may determine a type of action to perform in response to input received from input circuitry 216 or from communication network 214. For example, in response to identifying that a user has interacted with and manipulated the 3D object as instructed, the control circuitry 228 may perform the steps of processes described in FIGS. 1, and 4-14, including revealing an occluded feature of the 3D virtual object and providing access to requested data, and also perform all the steps and processes described in all the figures depicted herein.

In client/server-based embodiments, control circuitry 228 may include communication circuitry suitable for communicating with an application server (e.g., server 202) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 214). In another example of a client/server-based application, control circuitry 228 runs a web browser that interprets web pages provided by a remote server (e.g., server 202). For example, the remote server may store the instructions for the application in a storage device. The remote server may process the stored instructions using circuitry (e.g., control circuitry 228) and/or generate displays. Computing device 218 may receive the displays generated by the remote server and may display the content of the displays locally via display 234. This way, the processing of the instructions is performed remotely (e.g., by server 202) while the resulting displays, such as the display windows described elsewhere herein, are provided locally on computing device 218. Computing device 218 may receive inputs from the user via input circuitry 216 and transmit those inputs to the remote server for processing and generating the corresponding displays. Alternatively, computing device 218 may receive inputs from the user via input circuitry 216 and process and display the received inputs locally, by control circuitry 228 and display 234, respectively.

Server 202 and computing device 218 may transmit and receive content and data such as objects, frames, snippets of interest, and input from primary devices and secondary devices, such as AR devices. Control circuitry 220, 228 may send and receive commands, requests, and other suitable data through communication network 214 using transceiver circuitry 260, 262, respectively. Control circuitry 220, 228 may communicate directly with each other using transceiver circuits 260, 262, respectively, avoiding communication network 214.

It is understood that computing device 218 is not limited to the embodiments and methods shown and described herein. In nonlimiting examples, computing device 218 may be a primary device, a personal computer (PC), a laptop computer, a tablet computer, a WebTV box, a personal computer television (PC/TV), a PC media server, a PC media center, a handheld computer, a mobile telephone, a smartphone, a virtual, augmented, or mixed reality device, or a device that can perform function in the metaverse, or any other device, computing equipment, or wireless device, and/or combination of the same capable of suitably displaying primary content and secondary content.

Control circuitry 220 and/or 218 may be based on any suitable processing circuitry such as processing circuitry 226 and/or 240, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 220 and/or control circuitry 218 are configured to generate CAPTCHA challenges, display 3D virtual object, spatially anchor the 3D virtual objects, detect user interactions with 3D virtual objects displayed as part of the CAPTCHA challenge, monitor user movements in relation to the 3D virtual objects displayed, resize 3D virtual objects, occlude or hide features and elements of the 3D virtual object, reveal occluded elements and features of the 3D virtual object, query user for answers to releveled occluded feature of the 3D virtual object, determine whether to grant access to the requested secured data, access user's data, such as profiles, re-render the 3D virtual object based on user interactions and perform functions related to all other processes and features described herein, including those described and shown in connection with FIGS. 1 and 4-14.

Computing device 218 receives a user input 204 at input circuitry 216. For example, computing device 218 may receive a user input like touch to a 3D virtual object, a gesture to rotate or throw a virtual dice, actions to open a virtual box, or actions to place a virtual object overlaying a moving physical object.

Transmission of user input 204 to computing device 218 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 216 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 240 may receive input 204 from input circuit 216. Processing circuitry 240 may convert or translate the received user input 204 that may be in the form of voice input into a microphone, or movement or gestures to digital signals. In some embodiments, input circuit 216 performs the translation to digital signals. In some embodiments, processing circuitry 240 (or processing circuitry 226, as the case may be) carries out disclosed processes and methods. For example, processing circuitry 240 or processing circuitry 226 may perform processes as described in FIGS. 1 and 4-14, respectively.

FIG. 3 shows a generalized embodiment of an electronic equipment device 300, in accordance with one embodiment. In an embodiment, the equipment device 300, is the same equipment device 202 of FIG. 2. The equipment device 300 may receive content and data via input/output (I/O) path 302. The I/O path 302 may provide audio content (e.g., tone in one ear of a user for solving a CAPTCHA challenge). The control circuitry 304 may be used to send and receive commands, requests, and other suitable data using the I/O path 302. The I/O path 302 may connect the control circuitry 304 (and specifically the processing circuitry 306) to one or more communications paths. I/O functions may be provided by one or more of these communications paths but are shown as a single path in FIG. 3 to avoid overcomplicating the drawing.

The control circuitry 304 may be based on any suitable processing circuitry such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

In client-server-based embodiments, the control circuitry 304 may include communications circuitry suitable for allowing communications between two separate user devices to generate CAPTCHA challenges, display 3D virtual object, spatially anchor the 3D virtual objects, detect user interactions with 3D virtual objects displayed as part of the CAPTCHA challenge, monitor user movements in relation to the 3D virtual objects displayed, resize 3D virtual objects, occlude or hide features and elements of the 3D virtual object, reveal occluded elements and features of the 3D virtual object, query user for answers to releveled occluded feature of the 3D virtual object, determine whether to grant access to the requested secured data, access user's data, such as profiles, re-render the 3D virtual object based on user interactions and perform functions related to all other processes and features described herein, including those described and shown in connection with FIGS. 1 and 4-14.

The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the internet or any other suitable communications networks or paths. In addition, communications circuitry may include circuitry that enables peer-to-peer communication of primary equipment devices, or communication of primary equipment devices in locations remote from each other (described in more detail below).

Memory may be an electronic storage device provided as the storage 308 that is part of the control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 308 may be used to store CAPTCHA challenges, virtual 3D objects, occluded elements of the virtual 3D objects, user movements and interactions as related to the manipulation of the virtual 3D object, attempts made by user in solving a CAPTCHA challenge, user profiles, user consumption history, user background and education history, and AI and ML algorithms and all the functionalities and processes discussed herein. Cloud-based storage, described in relation to FIG. 3, may be used to supplement the storage 308 or instead of the storage 308.

The control circuitry 304 may include audio generating circuitry and tuning circuitry, such as one or more analog tuners, audio generation circuitry, filters or any other suitable tuning or audio circuits or combinations of such circuits. The control circuitry 304 may also include scaler circuitry for upconverting and down converting content into the preferred output format of the electronic device 300. The control circuitry 304 may also include digital-to-analog converter circuitry and analog-to-digital converter circuitry for converting between digital and analog signals. The tuning and encoding circuitry may be used by the electronic device 300 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 308 is provided as a separate device from the electronic device 300, the tuning and encoding circuitry (including multiple tuners) may be associated with the storage 308.

The user may utter instructions to the control circuitry 304, which are received by the microphone 316. The microphone 316 may be any microphone (or microphones) capable of detecting human speech. The microphone 316 is connected to the processing circuitry 306 to transmit detected voice commands and other speech thereto for processing. In some embodiments, voice assistants (e.g., Siri, Alexa, Google Home and similar such voice assistants) receive and process the voice commands and other speech.

The electronic device 300 may include an interface 310. The interface 310 may be any suitable user interface, such as a remote control, mouse, trackball, keypad, keyboard, touch screen, touchpad, stylus input, joystick, or other user input interfaces. A display 312 may be provided as a stand-alone device or integrated with other elements of the electronic device 300. For example, the display 312 may be a touchscreen or touch-sensitive display. In such circumstances, the interface 310 may be integrated with or combined with the microphone 316. When the interface 310 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the interface 310 may be HDTV-capable. In some embodiments, the display 312 may be a 3D display. The speaker (or speakers) 314 may be provided as integrated with other elements of electronic device 300 or may be a stand-alone unit. In some embodiments, the display 312 may be outputted through speaker 314.

The equipment device 300 of FIG. 3 can be implemented in system 200 of FIG. 2 as primary equipment device 202, but any other type of user equipment suitable for allowing communications between two separate user devices for performing the functions elated to implementing machine learning (ML) and artificial intelligence (AI) algorithms, and all the functionalities discussed associated with the figures mentioned in this application The electronic device 300 of any other type of suitable user equipment suitable may also be used to implement ML and AI algorithms, and related functions and processes as described herein. For example, primary equipment devices such as television equipment, computer equipment, wireless user communication devices, or similar such devices may be used. Electronic devices may be part of a network of devices. Various network configurations of devices may be implemented and are discussed in more detail below.

Figure 4:
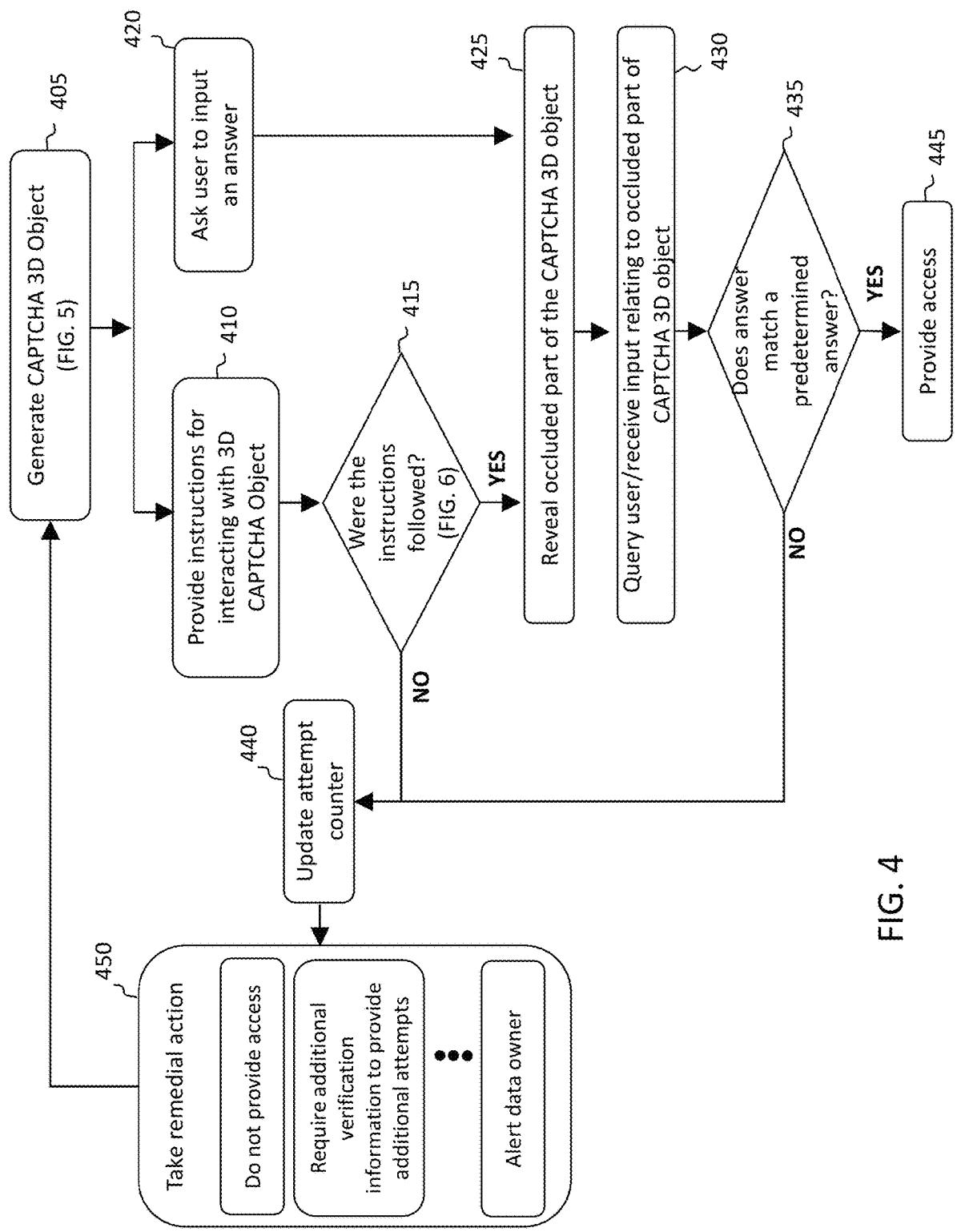
FIG. 4 is a flowchart of a process for generating a CAPTCHA challenge and determining access to requested data based on the completion of the CAPTCHA challenge, in accordance with some embodiments of the disclosure.

FIG. 4 is a flowchart of a process for generating a CAPTCHA challenge and determining access to requested data based on the completion of the CAPTCHA challenge, in accordance with some embodiments of the disclosure.

In some embodiments, as depicted at block 405, a 3D virtual object that is part of a CAPTCHA challenge is generated. The CAPTCHA challenge is generated in response to receiving a request from an electronic device associated with a user for access to certain data. The request may be for access to a website, documents or images in a secured database, media assets or subscriptions provided by a service, video games or any other online or secured content.

In some embodiments, the request may also be for access to an event, such as physical event or a virtual event (e.g., a seminar, a virtual media asset, a live event such as a live sports game, a concert, a seminar, or a virtual gaming environment). When the request is for an access to an event at a specific location, such as a stadium, concert hall, trade showroom, movie theater, or entrance to any live event, then the CAPTCHA may also be combined with verifying the location of the user device associated with the user. By adding the additional element of verifying actual location of the user's electronic device, the system may only allow access to the live events to those users that are physical present at the event location and answer the CAPTCHA challenge correctly. To do so, the system may track a location of the electronic device using the electronic device's GPS locator and reveal the occluded element of the 3D virtual object if the location of the electronic device is within a threshold distance of a predetermined location, e.g., within a mile, five miles, or whatever is set as the threshold distance. In such embodiments where the location is to be within a desired threshold distance, the system will require both a) the location of the electronic device to be within the threshold distance of the predetermined location and b) the response received relating to the occluded element of the 3D object to match a predetermined response, in order to grant access to the live event. In some embodiments, the control circuitry may ask the user to move the electronic device from a first location to a second location and it may track the location using GPS. The first and second location may be in the virtual or real world. Once a determination is made that the electronic device has been moved to a second location, the occluded object may be revealed.

In some embodiments, the CAPTCHA comprises a random virtual object, and in other embodiments, the control circuitries 228 or 220 may leverage user details, industry data, prior CAPTCHAs, and CAPTCHAs resolved by related users to generate a customized virtual object as part of the CAPTCHA challenge. Additional details relating to the generating of the CAPTCHA 3D objects are described in relation to the description provided in FIG. 5.

In terms of leveraging user details, the control circuitry may, for example, determine the user's expertise in a field, their title, job description, groups to which the user is connected, any equipment, processes, job roles, and/or topics in which the user is proficient, their education, degrees, positions held, etc. The control circuitry may use such details and personal information to develop a user profile or add to an existing user profile. The control circuitry may use the profile information to generate a customized CAPTCHA that is based on the user's personal information.

In addition to the user's details and personal information, the user's consumption history may also be leveraged to generate a customized CAPTCHA. For example, the user may frequently browse a website or may be part of a forum or platform that discusses certain specific topics, such as an employee group at work, a sports club, an online series of classes. Or the user may consume similar content on social media sites, etc. From this information, a pattern may be detected based on the user's consumption history, which may be leveraged to generate a customized CAPTCHA based on the pattern. Tools such as AI engines running AI algorithms or machine learning (ML) engines running ML algorithms may be used by the control circuitry to detect such user patterns for generating customized 3D CAPTCHA virtual objects.

In some embodiments, the 3D virtual object may be spatially anchored to an object in either a virtual or real environment. In other words, the 3D virtual object may be associated with a 3D coordinate system in which a real or a virtual object is used as an origin and the 3D virtual object's coordinates are defined based on this origin.

The 3D CAPTCHA virtual object generated may include an occluded feature. The occluded feature may be hidden and not disclosed at the first instance. In order to uncover, reveal, or unveil the occluded feature, the control circuitry may require the electronic device associated with the user to perform certain movements or manipulations, or follow certain instructions.

At block 410, the control circuitry may transmit the above-mentioned instructions to the electronic device that is requesting access to secured data. In some embodiments, the instructions may require specific interactions, and in other embodiments, the instructions may be more general such that a variety of different interactions or manipulations could reveal the occluded element. For example, instructions with specific interactions may include something like walk to the left, turn right, climb up, rotate the object right and then remove a cover, open a box, remove a crate from a structure to uncover, reveal, or unveil the occluded feature.

The general instructions may allow the user to use their own judgment, such that the user may use multiple paths to achieve a final result that is satisfactory to the control circuitry. For example, a general instruction may require an electronic device to interact with three virtual dice shown in a virtual environment such that a product of all the three faces shown on the three dice equals a sum of 9. in this example, the user is not limited to a particular sequence of granular setup instructions that need to be followed step by step to achieve the final result, which is a sum of 9. The user may interact with the three dice and rotate the dice in any desired direction, orientation, or combination, such as a) 1+4+4, b) 3+5+1, c) 2+2+5, or d) 6+1+2, where each number represents a face of the dice that is displayed, to achieve the final sum of 9.

On the other hand, a specific instruction may require an electronic device to interact with three virtual die shown in the virtual environment in a specific manner, such as rotate the first dice clockwise, rotate the second dice from top to bottom three times, or instructions such as "Rotate the first dice until it displays a number 3 on its face," etc. The specific instructions may also require the electronic device to perform movements in the 6DOF specifically as instructed.

The instructions provided may be in a textual, visual, or auditory format. For example, a tone may be provided in a right ear of a user to make certain manipulations or displacements with respect to the virtual 3D object and another set of instructions may be provided in the left ear. In another embodiment, arrows or images that include visual instructions may be displayed on the user's electronic device. In yet another embodiment, a pop-up window may be used to display textual instructions. In yet another embodiment, the textual instructions may be displayed on a display screen and may be enhanced, such as highlighted, camouflaged, colored, etc.

At block 415, a determination is made if the instructions provided were followed. When general instructions are provided, a more relaxed approach may be used that allows the user to freely use any type of movement of or interaction with the virtual 3D virtual object as long as the end result is as instructed. However, when specific instructions are provided where certain manipulations, movements, interactions, including in a sequence, are required, then the control circuitry may monitor the user's interactions via a plurality of hardware components associated with the electronic device used. For example, such hardware components may include a gyroscope, an accelerometer, inertial sensors, vibration sensors, and/or motion sensors. The monitoring may involve determining whether each movement and interaction with the virtual 3D object follows the provided instructions. Accordingly, the monitoring may include analyzing all 6DOF of the user and determine if the motions follow the instructions. Additional details relating to following of instructions for solving the CAPTCHA challenge are described in relation to the description provided in FIG. 6.

Upon a determination that the instructions, whether general or specific, were followed ("Yes" at 415), then, at block 425, the control circuitry will reveal the occluded part of the CAPTCHA 3D object. For example, in a setting where the occluded part of the 3D object is hidden inside a box, if instructions such as "Virtually lift the box in the virtual environment, move it virtually to a specific location, and then open the box" were followed by the user through use of their electronic device, then the control circuitry will reveal those occluded contents inside the box to the user. On the other hand, if the instructions provided at block 410 were not followed ("No" at 415), then the control circuitry will not reveal the occluded part of the CAPTCHA 3D object and may allow additional attempts to the user for conforming to the provided instructions.

In another embodiment, at block 420, the control circuitry may require the user to solve the CAPTCHA challenge based on the virtual 3D object displayed at block 405, or provide an answer related to virtual 3D object, without providing any instructions. In this instance, the user may be required to use their own skill and judgment in correctly solving the CAPTCHA challenge or providing a correct answer. If the challenge is solved correctly or a correct answer is provided, which is determined by the control circuitry, then the control circuitry will, at block 425, reveal the occluded part of the CAPTCHA 3D object. On the other hand, if the challenge is not solved or an answer is not provided that matches a predetermined correct answer or solution, then the control circuitry will not reveal the occluded part of the CAPTCHA 3D object and may allow additional attempts to the user for solving the CAPTCHA challenge and providing a correct answer.

In some embodiments, as depicted at block 430, upon revealing the occluded part of the CAPTCHA 3D object, the control circuitry may query the user to input what occluded feature was revealed. For example, this may include having the user to input a number that is revealed on a dice that was previously occluded, disclose the contents inside a box that were previously occluded, or respond to some other query and provide input of what occluded part was revealed.

At block 435, the control circuitry may determine whether the answer relating to the occluded part, as provided by the user via their electronic device, matches a predetermined answer. If a determination is made at block 435 that the answer provided matches the predetermined answer, then the control circuitry, as depicted at block 445, will provide access to the requested secure data.

However, if a determination is made at block 435 that the answer does not match a predetermined answer, then one of the following remedial actions as provided in block 450 may be executed. In some embodiments, if the provided answer does not match a predetermined answer, then the remedial action taken by the control circuitry may be to not provide access to the secure data. In another embodiment, the remedial action taken may require additional verification information from the user and only upon providing of such additional verification information, additional attempts to solve the CAPTCHA challenge may be provided. In yet another embodiment, a remedial action may be to alert the owner of the website or data that a failed CAPTCHA challenge has occurred.

In yet another embodiment, as depicted in block 440, the control circuitry may provide additional attempts for the user to solve the CAPTCHA challenge. The control circuitry may update a counter each time an unsuccessful attempt is made at solving the CAPTCHA challenge. Once a predetermined number of attempts at solving the CAPTCHA challenge have occurred, the control circuitry may take any one of the remedial actions as depicted in block 450 and described above.

Figure 5:
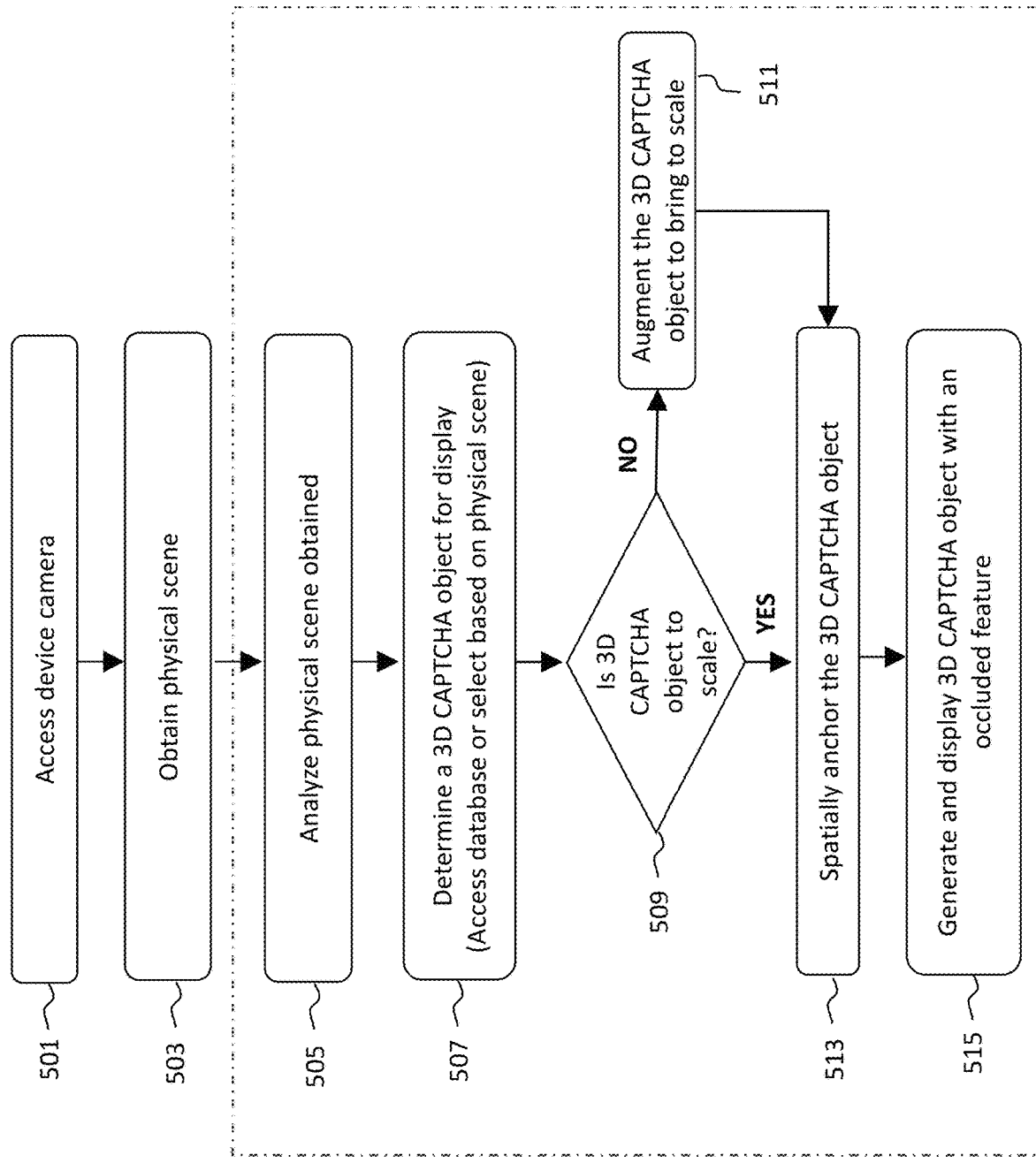
FIG. 5 is a flowchart of a process for displaying a virtual 3D object as part of the CAPTCHA challenge, in accordance with some embodiments of the disclosure.

FIG. 5 is a flowchart of a process for displaying a virtual 3D object as part of the CAPTCHA challenge, in accordance with some embodiments of the disclosure.

In some embodiments, at block 501, the control circuitry may access a camera associated with the user's electronic device. Using the camera, such as an outward-facing camera of a mobile phone, at block 503, a physical scene (i.e., live or real-time scene) that is in the field of view of the camera may be received. For example, the user may be wearing a virtual reality headset or smart glasses or using their mobile phone as a virtual reality device. The live scene may be a live image of what is visible through a camera associated with such devices that is in the field of view of the camera. The live scene may change dynamically as a user moves from one location to another or orients the camera of the electronic device in a different direction. In a headset device, if the user rotates or orients their head such that their field of view has changed, the control circuitry may update the live image accordingly.

The live physical may be analyzed at block 505 to determine its scale and dimensions. Since the live scene may change dynamically based on the field of view of the camera, the live scene may be analyzed periodically of when a change in scenery occurs.

A 3D object that can be used for the CAPTCHA challenge may be obtained from a database, as depicted at block 507. Considering the scale and dimensions of the physical scene as determined at block 505, at block 509, the control circuitry may determine whether the 3D virtual object used in the CAPTCHA challenge is to scale, relative to the real physical image obtained at block 503. For example, if a real-life image is of a small pond and that 3D virtual object used as the CAPTCHA challenge is a duck, then the control circuitry would determine whether the size of the duck is to scale such that the duck may fit in the pond. If the size of the duck is much larger than the image of the pond, or not to scale with respect to the pond, then the control circuitry may augment the 3D CAPTCHA object, i.e., the duck, at block 511, and then spatially anchor the 3D CAPTCHA object at block 513. If a determination is made at block 509 that the 3D CAPTCHA object is to scale, then the process may move directly from block 509 to block 513, where the 3D CAPTCHA object is spatially anchored.

At block 515, the control circuitry may display that 3D CAPTCHA object on a display screen associated with the electronic device such that a feature or element of the 3D CAPTCHA object is occluded.

Since a physical scene obtained may dynamically change with every movement of the camera, the process of blocks 505-515 may be repeated with every physical scene change or at predetermined intervals to ensure that the 3D CAPTCHA object is to scale relative to the physical scene.

Figure 6:
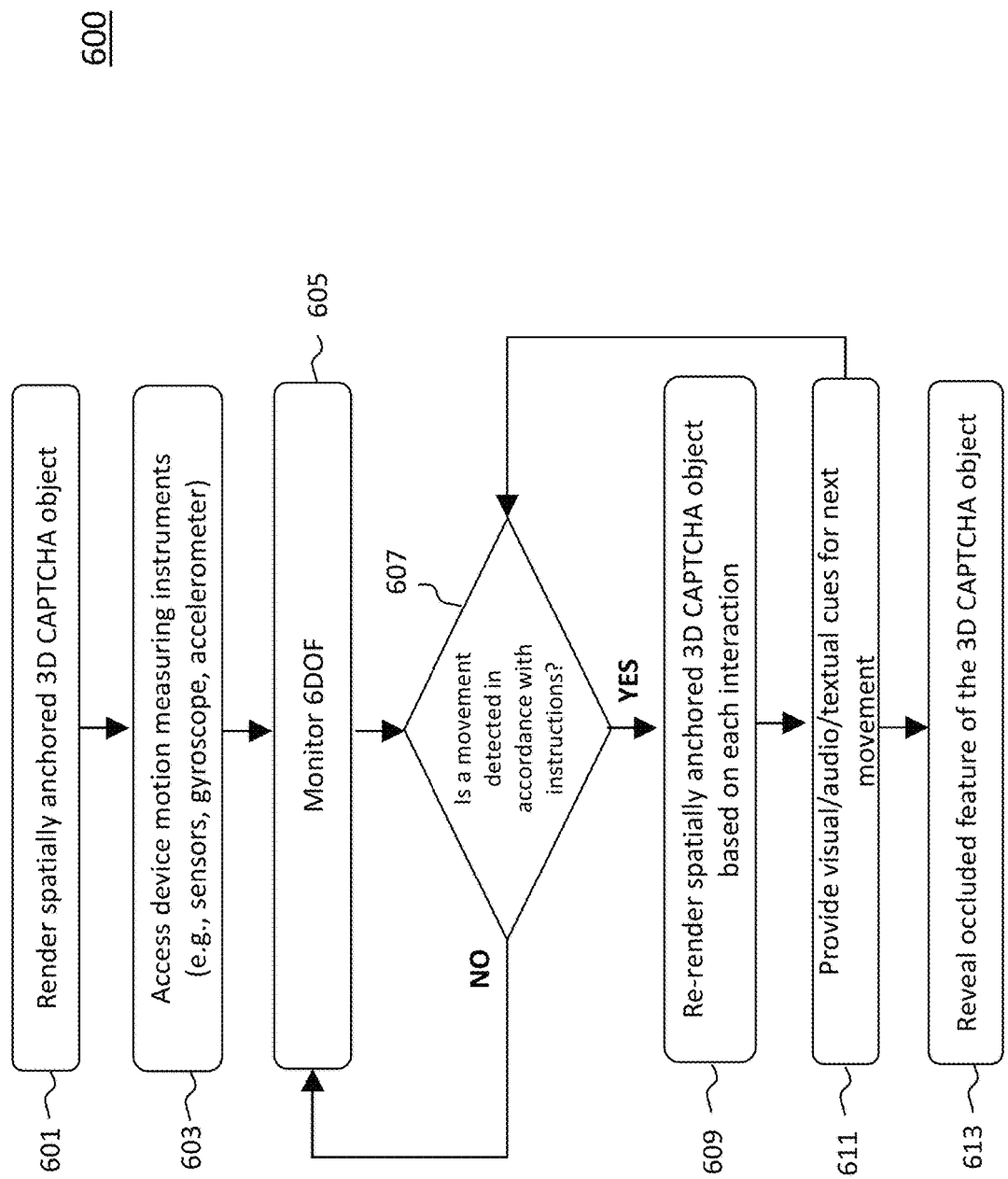
FIG. 6 is a flowchart of a process of monitoring a user's movements and displacements related to the 3D virtual object that is part of the CAPTCHA challenge, in accordance with some embodiments of the disclosure.

FIG. 6 is a flowchart of a process of monitoring a user's movements and displacements related to the 3D virtual object that is part of the CAPTCHA challenge, in accordance with some embodiments of the disclosure.

In some embodiments, process 600 is used for monitoring user movements with respect to the user's interactions with the 3D virtual object that is part of the CAPTCHA challenge, determining whether the movements follow the instructions provided by the control circuitry, and re-rendering the 3D virtual object after each movement. The process also may be used to provide step-by-step instructions to the user, such that each subsequent instruction is provided after a previous instruction is accurately followed. Accordingly, in some embodiments, the control circuitry may render a spatially anchored 3D CAPTCHA object at block 601. The rendered object may include an occluded feature or element that is not disclosed at this stage of the process.

Upon rendering the object, the control circuitry may monitor the user's movements and interactions with the virtual 3D object following the provided instructions. The movements and interactions may be in the real world or in the virtual world as displayed in a virtual environment. In order to monitor such movements, as depicted at block 603, the control circuitry may utilize one or more hardware components associated with the electronic device, such as a gyroscope, an accelerometer, inertial sensors, vibration sensors, and/or motion sensors.

When specific instructions are provided for the types of movements or the type of sequence that the user is required to follow to unveil or reveal the occluded feature, the monitoring may involve determining whether each movement and interaction with the virtual 3D object follows the provided instructions. Accordingly, the monitoring may include analyzing all 6DOF of the user to determine if the motions follow the instructions, as depicted at blocks 605 and 607.

If a determination is made at block 607 that the movements detected are not in accordance with the instructions provided by the control circuitry or that no movement is detected, then the process may move back to block 605, where the control circuitry may continue to monitor the 6DOF until a movement is detected.

If a determination is made at block 607 that the movements detected are in accordance with the instructions provided by the control circuitry or that a movement is detected, then at block 609, the control circuitry may re-render the spatially anchored 3D CAPTCHA object such that the re-rendering reflects the movement of or interaction with the 3D CAPTCHA object by the user.

At block 611, the control circuitry may provide visual, audio, or textual cues for the next movement if a determination is made that the prior movement determined at block 607 was in accordance with the provided instructions.

Process of blocks 607-611 may be repeated until all the movements required to successfully complete the CAPTCHA challenge are completed. For example, if a capture challenge includes a sequence of four steps to be completed, block 607-611 may be repeated until all four steps are completed.

At block 613, the control circuitry may reveal the occluded feature of the 3D CAPTCHA object once a determination is made that all the movements were accurately made as instructed, including if such instructions were to complete the movements in a particular sequence. In some embodiments, the control circuitry may match the movements to a predetermined movement to determine if the movements were performed as instructed.

Figure 7:
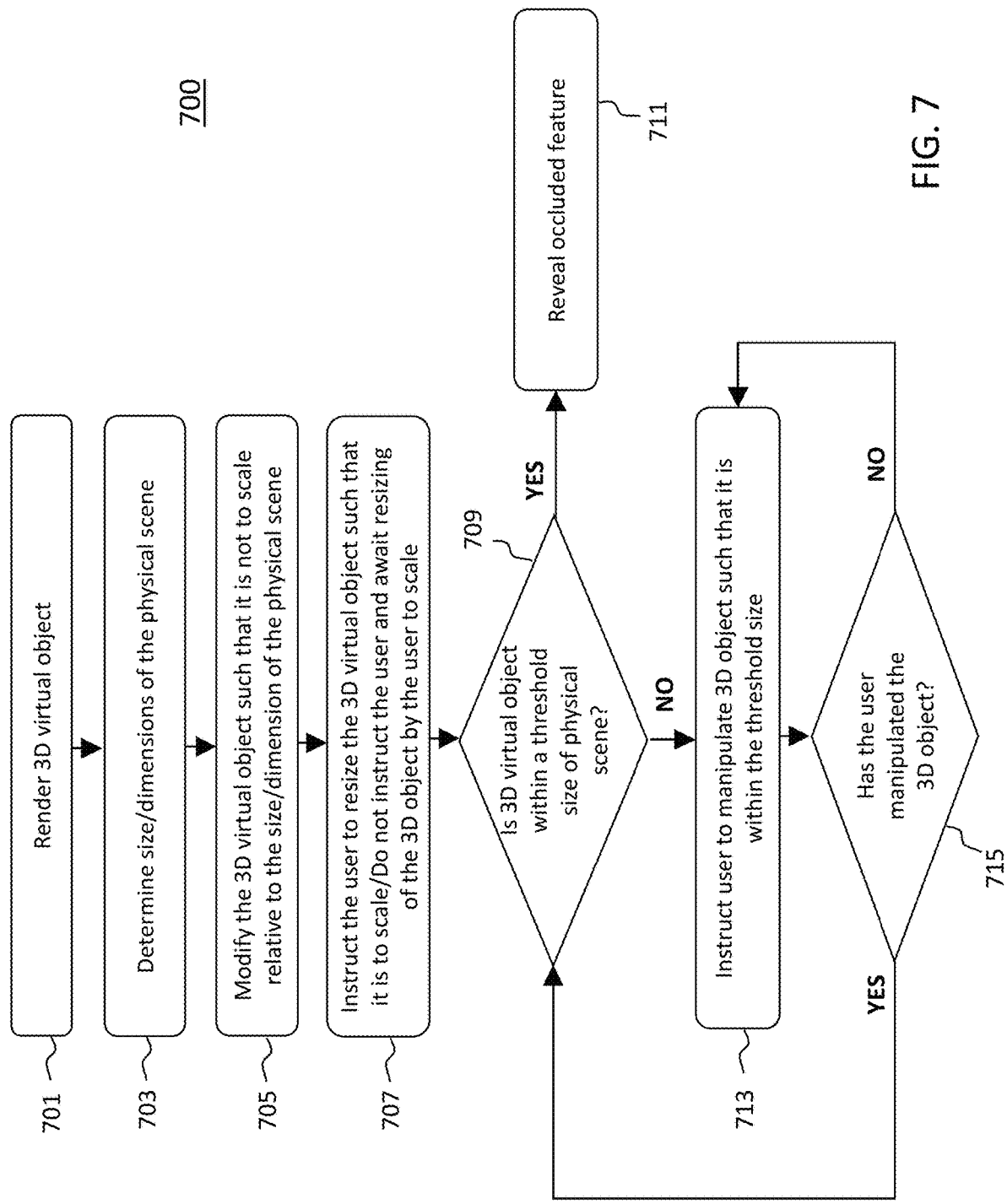
FIG. 7 is a flowchart of a process of determining whether a CAPTCHA challenge that includes displaying a 3D virtual object that is not to scale is successfully completed, in accordance with some embodiments of the disclosure.

FIG. 7 is a flowchart of a process of determining whether a CAPTCHA challenge that includes displaying a 3D virtual object that is not to scale is successfully completed, in accordance with some embodiments of the disclosure.

In some embodiments, process 700 includes a CAPTCHA challenge in which a spatially anchored 3D virtual object is purposely displayed not to scale with respect to its physical scene or virtual environment. The CAPTCHA challenge may either provide instructions or allow the user to use their own skill and knowledge in resizing the not-to-scale 3D virtual object. A successful completion of the challenge may include the user resizing the not-to-scale object such that once resized, the 3D virtual object is within a threshold size of its physical scene or virtual environment. For example, the challenge may include depicting a 3D pencil with an eraser on the end of the pencil. The CAPTCHA challenge may purposely display the eraser not to scale, such as the eraser being too small or larger than the pencil, and require the user to manipulate the eraser such that it fits the end of the pencil. The user may be able to successfully complete the challenge by resizing the eraser in the virtual space such that the resized eraser is within a threshold size of a predetermined scale.

The above-described CAPTCHA challenge may include, in some embodiments, rendering the spatially anchored 3D virtual object at block 701.

As part of the CAPTCHA challenge, the control circuitry at block 703 may access the camera device and determine the size and dimensions of a physical scene that is within the field of view of the camera.

Once the size of the physical scene is determined, the control circuitry may either use a real-life object that is displayed in the physical scene and generate a representation of the real-life object as a 3D virtual object or obtain a 3D virtual object from a database that can be used for the CAPTCHA challenge. At block 705, the control circuitry may modify the 3D virtual object such that it is purposely not to scale relative to the size and dimensions of the physical scene. Such distortion may be performed to challenge the user and determine if the user can interact with a 3D object and manipulate it to a scale that is within a threshold size of the physical scene.

At block 707, the control circuitry may instruct the user to resize the 3D virtual object such that it is to scale relative to the physical scene. In another embodiment, the control circuitry may display the 3D virtual object not to scale without providing any instructions. The control circuitry may wait for the user to interact with the 3D object and resize it to scale. In some embodiments, the control circuitry may allow a certain amount of time for the user to resize the 3D object to scale. If the user is unable to resize the 3D object within the allotted time, the control circuitry may either not provide access to the requested data or provide another attempt by providing another 3D virtual object different from the earlier-provided 3D virtual object as part of the CAPTCHA challenge and restart the clock.

At block 709, the control circuitry may determine if the 3D object has been manipulated such that it is within the threshold size of the physical scene. The control circuitry may predetermine a range of sizes and dimensions of the 3D object as within the acceptable threshold size.

If a determination is made at block 709 that the 3D virtual object, after it has been manipulated by the user, is within the threshold size of the physical scene, then the control circuitry at block 711 may reveal an occluded feature of the 3D virtual object.

If a determination is made at block 709 that the 3D virtual object, after it has been manipulated by the user, is not within the threshold size of the physical scene, then the control circuitry at block 713 may instruct the user to manipulate the 3D virtual object such that it is within the threshold size of the physical scene.

At block 715, after providing instructions to the user, the control circuitry may determine whether the user has manipulated the 3D object in accordance with the provided instructions. If a determination is made that the user has not manipulated the 3D object in accordance with the provided instructions, then the process may return to block 713, where the control circuitry may provide instructions for the user to manipulate the 3D object. In some embodiments, steps 713 and 715 may be repeated, thereby providing a certain number of attempts to the user to solve the CAPTCHA challenge. If the user is unable to solve the CAPTCHA challenge within the allotted number of attempts, then the control circuitry may time out, regard the attempts to solve the captured challenge as unsuccessful, or perform any one or the remedial actions as described in block 450 of FIG. 4.

If a determination is made that the user has manipulated the 3D object, then the process may return to block 709, where the control circuitry may determine whether the manipulated object is within the threshold size. If a determination is made at block 709 that the 3D virtual object, after it has been manipulated by the user, is within the threshold size of the physical scene, then the control circuitry at blocked 711 may reveal an occluded feature of the 3D virtual object.

Figure 8:
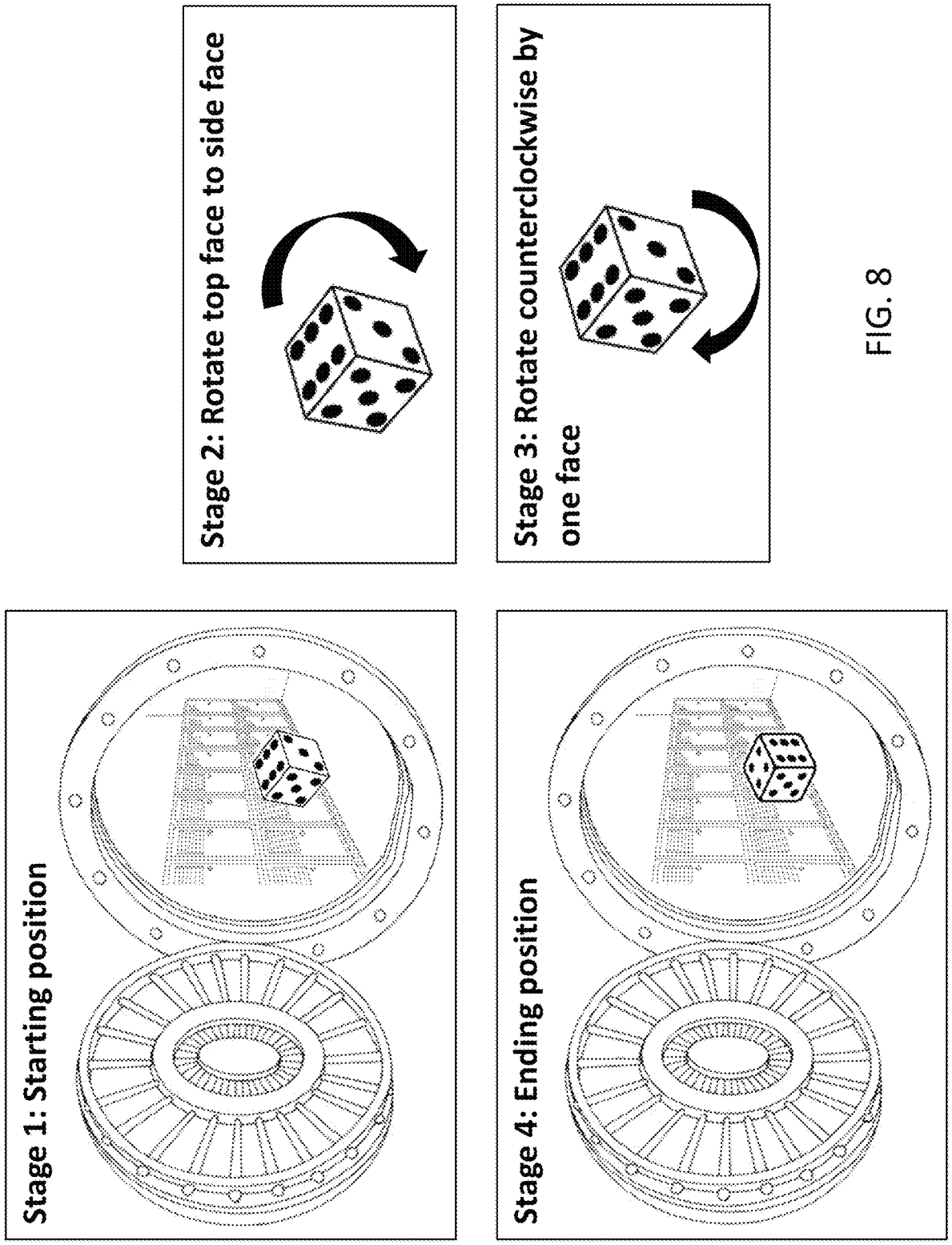
FIG. 8 is an example of a CAPTCHA challenge, in accordance with some embodiments of the disclosure.

FIG. 8 is an example of a CAPTCHA challenge, in accordance with some embodiments of the disclosure. In this CAPTCHA challenge, the control circuitry may access a camera of an electronic device and use the physical scene that is visible in the field of view of the camera as the physical scene in which to display a 3D virtual object.

In this example, the physical scene in the field of view of the camera is a bank vault with lockers or deposit boxes inside the bank vault. As such, the control circuitry may use the bank vault with lockers as the physical scene in stage 1 of the process.

At stage 1 of the process, the control circuitry may obtain a virtual 3D object from a database, augment it to size relative to the physical scene, and then display it in a virtual environment overlaying the bank vault with the lockers. As depicted, a dice was obtained from the database, scaled to size such that it is not too large or too small relative to the bank lockers and then displayed in the virtual environment. In other words, the dice is only virtually displayed within the display of the virtual, mixed, or augmented reality device such as a headset, smart glasses or mobile phone.

In some embodiments, the control circuitry may provide instructions on an electronic device associated with the user. The instructions may be textual, visual, or auditory. The instructions may require the user to interact with the 3D dice and manipulate it to a face of the dice that displays a desired result, such as the number 4 on the top face.

The instructions may be general or specific. In some embodiments, specific instructions may provide step-by-step manipulation instructions that need to be followed in a sequence. For example, as depicted in stages 2 and 3, the control circuitry may require the user to first rotate the top face of the dice to its side face and sequentially rotate the dice counterclockwise by one face.

If a determination is made by the control circuitry that the user has followed the instructions as provided, i.e., the specific instructions as depicted in stages 2 and 3 were followed, then, at stage 4, the control circuitry may reveal the occluded feature of the dice which is the number 4 on top. In another embodiment, the control circuitry may reveal some other occluded feature which is not on the dice. For example, the control circuitry may open one of the lockers and display its contents to the user.

Figure 9B:
FIGS. 9A-9B are an example of a CAPTCHA challenge, in accordance with some embodiments of the disclosure.
Figure 9A:

FIGS. 9A and 9B are examples of a CAPTCHA challenge, in accordance with some embodiments of the disclosure. In these examples, as depicted in FIG. 9A, the control circuitry may display a dice with its face showing the number 3 on the electronic device used by the user. The dice may be displayed as overlayed on a room that is within the field of view of a camera associated with an electronic device used by the user to access secured data.

In some embodiments, the control circuitry may provide a cue that is both visual and textual, such as the visual arrow along with text inside the arrow that states "touch the dice to rotate," or "rotate the dice." Once a user performs the action by making the dice rotate, as depicted in FIG. 9B, the control circuitry may provide a subsequent instruction that requires the user to touch the dice, which now shows a face having the number five.

Embodiments depicted in FIGS. 9A and 9B may also be used to provide another alternative CAPTCHA challenge to the challenge described above. For example, in some embodiments, the virtual dice is spatially anchored and displayed to the user in a virtual environment. The virtual dice and the challenge question may require the user to walk or move around the object to reveal occluded secrets. In this case, the challenge question posed based on the revealed feature that was previously occluded by the control circuitry to the user may be a) What is the number shown on the revealed face of the dice and/or b) touch the front, top, or right face of the revealed face of the dice.

The control circuitry may record the user movements and compare them with either an answer or a set of gestures or movements needed to complete the challenge. Although the virtual environment and the virtual object are displayed in 3D, gestures can be executed on a 2D or 3D screen, not necessarily requiring a 3D screen at all times. For the cases of using a 2D screen, the control circuitry may use an IMU sensor on a device (e.g., smartphone, tablet, smart glass, or headset) to enable the system to collect 6DOF 3D gesture or movement information.

Embodiments depicted in FIGS. 9A-9B may also be used to provide another alternative CAPTCHA challenge to the challenge described above. For example, in some embodiments, the control circuitry may instruct the user to touch a virtual object to rotate it. Every rotation may simulate a throw of the dice. The user may be instructed to throw the virtual dice a certain number of times and then provide the count on the "green" face of the dice. The green face may be initially occluded and only revealed after the user throws the dice for the number of times as instructed. The green face may be revealed to provide an answer to the CAPTCHA challenge question.

Figure 10C:
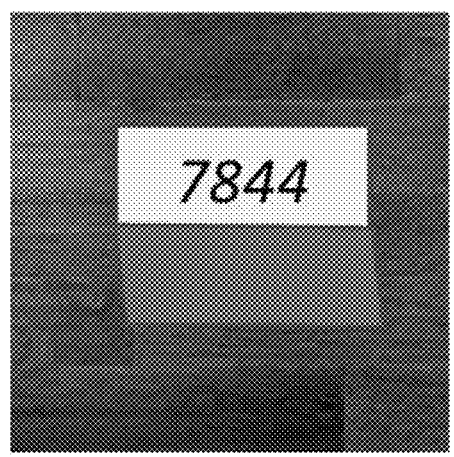
FIGS. 10A-10C are an example of a CAPTCHA challenge, in accordance with some embodiments of the disclosure.
Figure 10B:
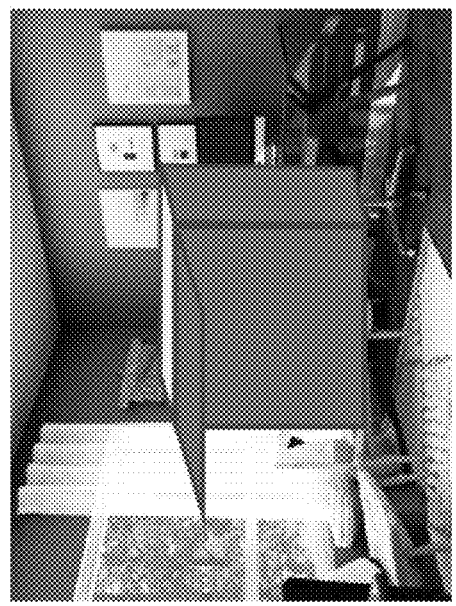
Figure 10A:

FIGS. 10A-10C are examples of a CAPTCHA challenge, in accordance with some embodiments of the disclosure. In this embodiment, as depicted in FIG. 10A, the control circuitry may display a virtual box that has an occluded feature or element. The virtual box may be displayed as overlayed on a room that is within the field of view of a camera associated with an electronic device used by the user to access secured data.

In some embodiments, the control circuitry may provide a visual cue as an instruction for the user to interact with the virtual box. As depicted in FIG. 10A, the visual cue may be an arrow pointing to the virtual box.

In response to displaying the visual cue, the control circuitry may receive an indication of the virtual box being manipulated. Such manipulation may be performed by the user in several ways. For example, depending on the type of capabilities of the system, the user may use an avatar of their hands in the virtual environment and open the box, the user may also tap on the box by tapping on their display screen to open the box or may perform other allowed movements that result in the opening of the box as depicted in FIG. 10B.

Once a determination is made that the user has successfully opened the box, such as depicted in FIG. 10B, the control circuitry may then reveal an occluded element associated with the virtual box. For example, as depicted in FIG. 10C, the occluded element is a number, 7844. Although the occluded element is depicted as a number inside the virtual box, the embodiments are not so limited, and the occluded element may also be displayed at other locations in the room. For example, the room as depicted in FIGS. includes a computer monitor that is located on a desk behind the virtual box. The control circuitry may overlay the occluded element on the computer monitor to make it look like the occluded element is part of the computer display.

Figure 11:
FIG. 11 is an example of a CAPTCHA challenge, in accordance with some embodiments of the disclosure.

FIG. 11 is an example of a CAPTCHA challenge, in accordance with some embodiments of the disclosure. In this embodiment, a virtual cat is displayed overlaying a carpet and a desk inside a physical room that may be visible in the field of view of the camera associated with the electronic device used by the user to obtain access to secured data.

In this CAPTCHA challenge, the control circuitry may place the virtual cat occluded by a physical object. The control circuitry may use a computer vision-based depth map creation using AI/ML models or LIDAR (Light detection and ranging)-based depth maps. The control circuitry may spatially anchor the virtual cat in space and instruct the user to uncover the occluded object behind the virtual cat to successfully answer the CAPTCHA challenge. The control circuitry may deploy various types of difficulties and challenges at different steps of granularity in the CAPTCHA challenge, based on the level of security needed to protect the data that is to be accessed. For instance, in order to make the challenge even more challenging, a partially occluded digital cat image may be offered to the user to test whether the user is able to differentiate from the real physical world and move the digital object (the cat image) to bring the full scale of the digital object into focus. Moreover, leveraging the computer vision (CV) algorithms mentioned above, control circuitry can acquire a dominant color/shade present in the background physical environment and place a similar color mask on the digital object to make it blend more with the environment, in order to make the challenge more difficult.

Figure 12:
FIG. 12 is an example of a CAPTCHA challenge, in accordance with some embodiments of the disclosure.

FIG. 12 is an example of a CAPTCHA challenge, in accordance with some embodiments of the disclosure.

In this embodiment, a virtual model of a statute is used and overlayed in front of a person standing in a museum. In this challenge, the control circuitry places the virtual object, the statute, so that it occludes the entire or portions of a physical object, the person standing. The control circuitry may use CV-based depth map creation using AI/ML models or LIDAR-based depth maps to provide such a virtual display.

In some embodiments, the control circuitry may spatially anchor the virtual object in space and instruct the user to displace the virtual object behind the physical object. As such, the control circuitry may require the statute to be displayed such that it is moved from covering the standing person to one of the walls of the museum or to another room where the statue should be located. By providing such a challenge, where depth perception is involved, the control circuitry breaks the natural perception and experience so that it would be challenging or not possible for a non-human to resolve.

In one embodiment, depth perception challenges may include the control circuitry to display the 3D virtual object at a first depth from a user's eye in a virtual environment. The control circuitry may then instruct the user of the electronic device to displace the displayed 3D virtual object to a second depth from the user's eye in the virtual environment. In this example, the first depth is at a different depth perception from the second depth and the second depth is the 3D virtual object's designated resting place. For example, a painting in a museum is shown at a first depth perception to the user, i.e., closer to the user, hanging in midair without it being mounted on any wall, and half the distance between the user and the wall, when the user sees it through their virtual reality headset. The instructions may be to move the painting further back and on to a wall where the painting belong, i.e., a second depth perception that is farther from the user's eye. In some embodiments, such depth perception may be measured with respect to the virtual, augmented reality headset or glasses.

In some embodiments, the challenge may be made harder based on the user's background and details. For example, if the control circuitry using AI determines that the user is knowledgeable in Egyptian history, in which the statute belongs, then it may customize the digital object such that only a person with such knowledge is able to answer the CAPTCHA question.

Figure 13:
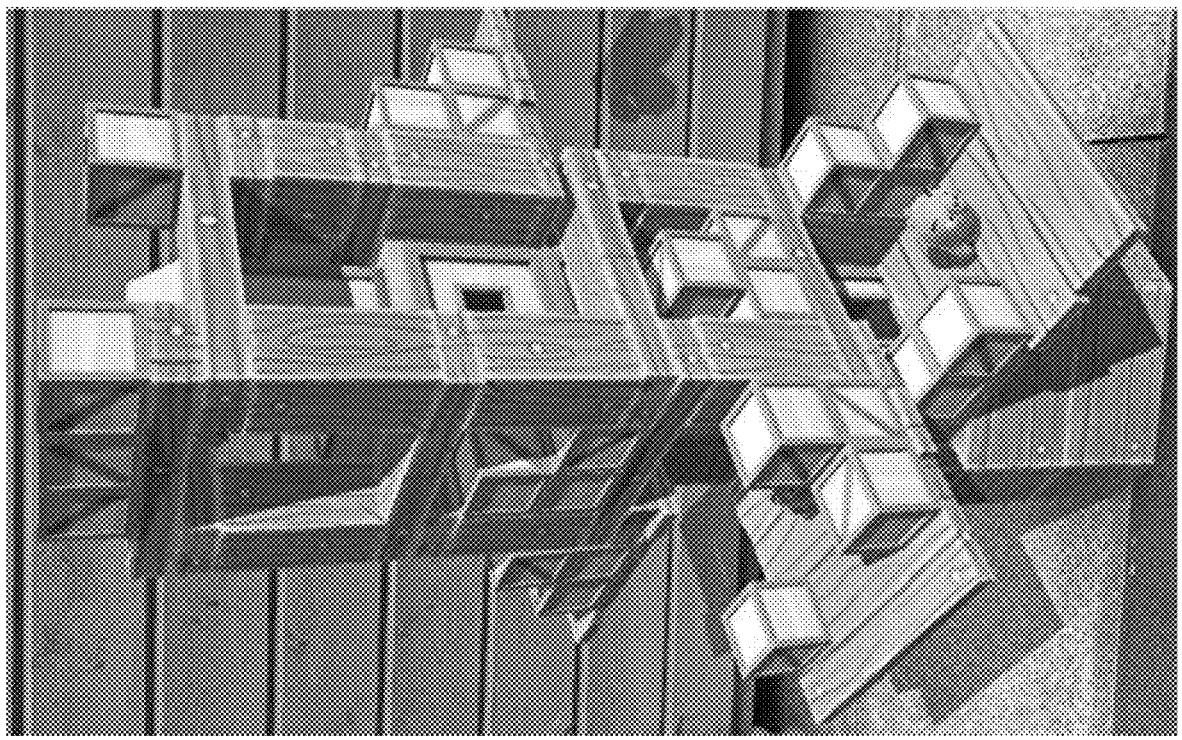
FIG. 13 is an example of a CAPTCHA challenge, in accordance with some embodiments of the disclosure.

FIG. 13 is an example of a CAPTCHA challenge, in accordance with some embodiments of the disclosure. In this embodiment, the control circuitry may place a first virtual object in the physical environment that occludes a second virtual object. The second virtual object may hold the answer to the CAPTCHA challenge question. The control circuitry may instruct the user to perform movements to reach the first virtual object, move it (guided by the system), uncover the second virtual object, and then perform an operation to reveal the occluded secret. For instance, the control circuitry may instruct the user to rotate the virtual wooden block to reveal the virtual green angry bird and then tap it to make it fly.

Figure 14:
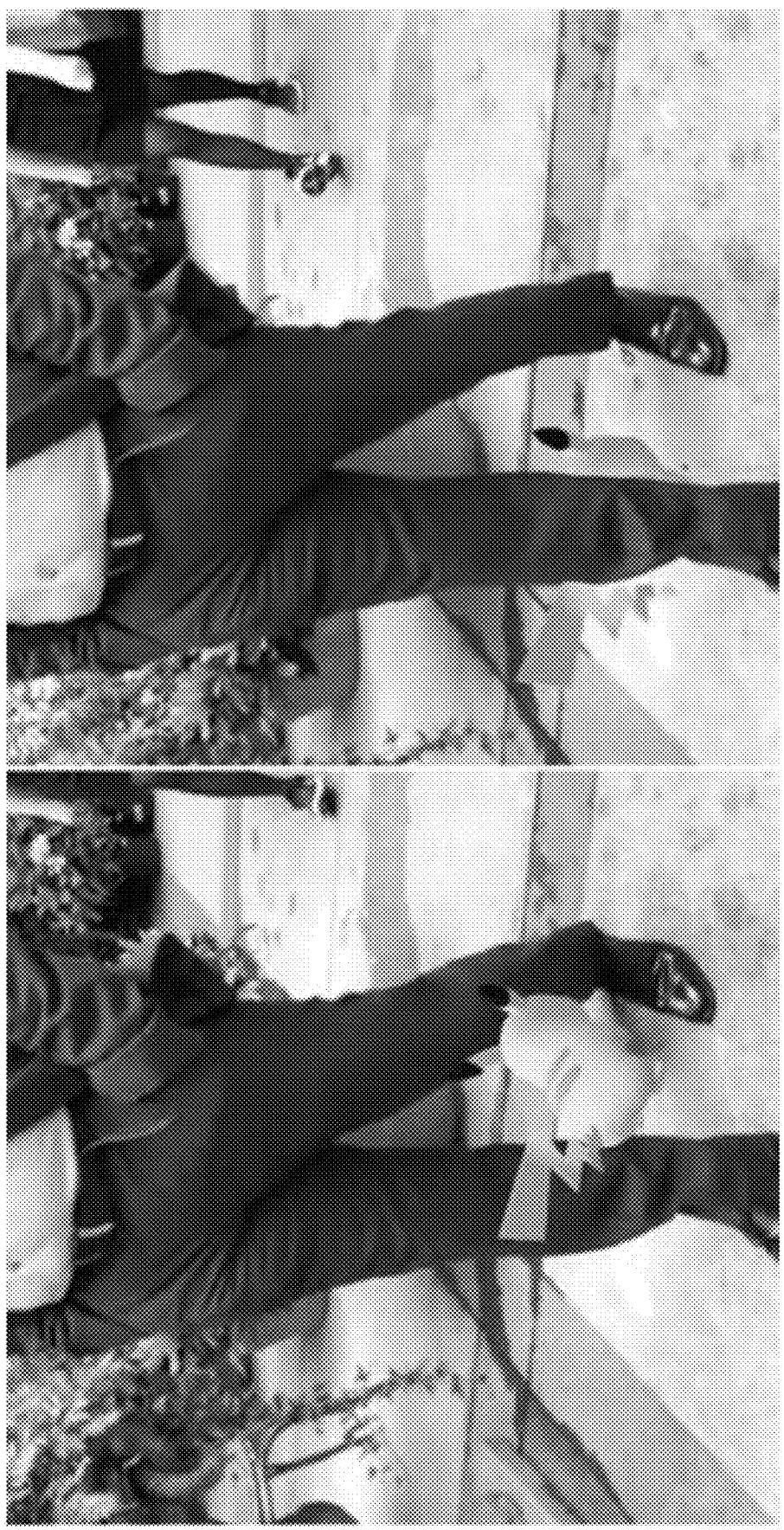
FIG. 14 is an example of a CAPTCHA challenge, in accordance with some embodiments of the disclosure.

FIG. 14 is an example of a CAPTCHA challenge, in accordance with some embodiments of the disclosure. This CAPTCHA challenge may involve a head-mounted display (HMD), such as a virtual, augmented, or mixed reality headset. In this embodiment, the control circuitry may utilize components of the HMD to determine the user's gaze and orientation. For example, the control circuitry may utilize an inward-facing camera of the HMD to track the user's eyeball movement and determine the gaze of the user. The control circuitry may also utilize an IMU, gyroscope, accelerometer, inertial sensors, vibration sensors, and/or motion sensors to determine the user's movements and orientation. The control circuitry may collect data relating to 6DOF of the user by using the eye-tracking and head-tracking components to determine what is being seen by the user device as opposed to being spoofed by a bot.

In another embodiment, the control circuitry may also utilize spatial audio while issuing the CAPTCHA challenge to the user. In this embodiment, the control circuitry may access a wearable audio device (such as AirPods™, earbuds or audio speakers on HMDs) associated with the user that is seeking access to the secured data. The control circuitry may use spatial audio to instruct the user and provide cues, thereby directing the user to the virtual objects or to where the challenges are hidden (e.g., for instance when a complex 3D model is used). In this embodiment, the control circuitry may employ head-related transfer function (HRTF) data from the wearable audio device to ensure that the user is compliant with the audio cue before displaying the 3D model or updating the 3D model after user movement. This additional method may be used by the control circuitry as a secondary step of verifying the answer to the CAPTCHA challenge. By using this embodiment, the control circuitry may enforce a specific 6DOF path and/or sequence for the user to follow in order to successfully complete the CAPTCHA challenge.

For example, the control circuitry may use a spatial tone and instruct the user in the user's left ear that the virtual character (e.g., Pikachu™) should be placed behind a leg, as the challenge. In response to the instruction, the user, in order to complete the CAPTCHA challenge, may be expected to move the character behind the man's left leg, as the physical object (man with the blue suit in this case) is mobile and walking through the physical space (optionally it could be a virtual space). This embodiment requires the control circuitry to continuously track the dynamic scene and the challenge object (leg in this case) via CV algorithms and match its location with respect to the virtual object in real time.

Although movements such as rotation, displacement, or requiring the user to move objects, walk around a virtual object, overlay a virtual object on a physical object, identify a camouflaged object and the like were discussed above, the movements and types of actions required are not so limited. For example, a CAPTCHA challenge may instruct the user to shake (or at least create the effect of shaking) the virtual object. The system may verify if such shaking has occurred based on the IMU sensors of the device. Since a bot in unable to replicate the shaking effect that is captured by IMU sensors of the device, such motions may further distinguish a human action from a bot. Likewise, the CAPTCHA challenge may instruct the user to shake the user device, the gaming controller associated with the device, or perform actions such as drop the device or gaming controller, elevate the device or gaming controller to a higher level from the ground etc.

Figure 15:
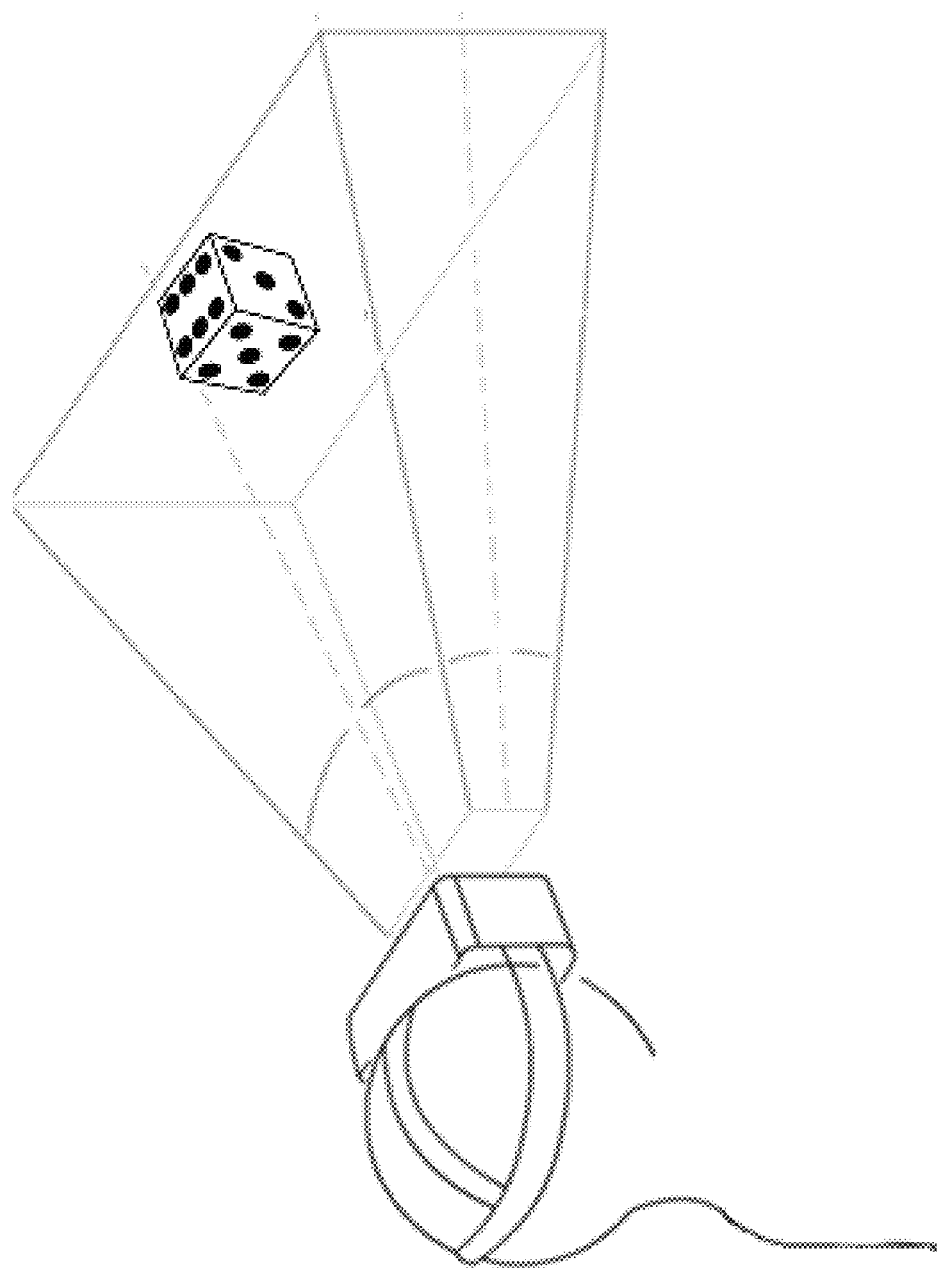
FIG. 15 is an example of a virtual, augmented, or mixed reality headset used in connection with the CAPTCHA challenge, in accordance with some embodiments of the disclosure.

FIG. 15 is an example of a virtual, augmented, or mixed reality headset used in connection with the CAPTCHA challenge, in accordance with some embodiments of the disclosure. The virtual reality headset may be used in any of the CAPTCHA challenge examples as described in FIGS. 8-14. Although reference is made to the headset in some of the examples above, the embodiments are not so limited, and the virtual reality headset may be used in any embodiments described herein. For example, in some embodiments, a virtual object, such as a dice displayed, may be placed inside the virtual world of the headset, and a CAPTCHA challenge may be generated that requires the manipulation of the virtual dice to reveal an occluded feature of the dice.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. An authentication method for providing secured access comprising:
   receiving a request from an electronic device for secured access;
   in response to the request for secured access:
   generating a Completely Automated Public Turing test to tell Computers and Humans Apart (CAPTCHA) challenge for the electronic device, wherein the CAPTCHA challenge includes:
   causing display, via the electronic device, of a 3D virtual object having an occluded element, wherein the 3D virtual object is spatially anchored to an object located in a virtual or real environment; and
   delivering instructions, via the electronic device, to interact with the displayed 3D virtual object in order to reveal the occluded element of the 3D virtual object;
   receiving, from the electronic device, a response identifying the occluded element of the 3D object; and
   determining whether to provide the secured access based on the received response.

2. The method of claim 1, further comprising:
   determining that the received response identifying the occluded element of the 3D object matches a predetermined response; and
   in response to the determination, providing the secured access.

3. The method of claim 1, further comprising:
   monitoring interactions with the displayed 3D virtual object by use of the electronic device;
   determining whether the monitored interactions match the delivered instructions to interact with the displayed 3D virtual object; and
   in response to determining that the monitored interactions match the delivered instructions to interact with the displayed 3D virtual object:
   revealing the occluded element of the 3D object.

4. The method of claim 1, further comprising:
   querying the electronic device to verify the revealed occluded element;
   receiving the response identifying the occluded element of the 3D object, wherein the received response is in response to the query to the electronic device for verifying the revealed occluded element; and
   providing the secured access if the response to the query matches a predetermined answer.

5. The method of claim 1, wherein the delivered instructions instruct a user of the electronic device to displace the electronic device from a first location to a second location at which the occluded element is visible in a field of view of the electronic device.

6. The method of claim 1, wherein the instructions include any two or more of the following instructions:

a) instructions to a user of the electronic device to touch the 3D virtual object;
b) instructions to a user of the electronic device to interact with the 3D virtual object by performing one or more interactions using the 3D object;
c) instructions to displace the 3D object within a virtual environment to a location as instructed;
d) instructions to displace the 3D object within a virtual environment to a location based on user knowledge of the 3D object;
e) instructions to solve a challenge by using the 3D virtual object;
f) instructions to rotate the 3D virtual object; or
g) instructions to shake the 3D virtual object or the electronic device.

7. The method of claim 1, further comprising:
   displaying the 3D virtual object at a first depth from a user's eye in a virtual environment; and
   instructing a user of the electronic device to displace the displayed 3D virtual object to a second depth from the user's eye in the virtual environment, wherein the first depth is at a different depth perception from the second depth and the second depth is the 3D virtual object's designated resting place.

8. The method of claim 1, further comprising:
   tracking a location of the electronic device using the electronic device's GPS locator; and
   revealing the occluded element of the 3D virtual object if the location of the electronic device is within a threshold distance of a predetermined location.

9. The method of claim 1, wherein the delivered instructions are delivered in any one or more of the following formats: a) audio instructions delivered through a speaker or earphones associated with the electronic device, b) a display on the electronic device, c) both audio and display instructions of options a) and b), or d) a pop-up display on the electronic device.

10. The method of claim 1, wherein the occluded element of the 3D virtual object is initially hidden from a field of view of the electronic device.

11. A system for providing secured access comprising:
    communication circuitry configured to access an electronic device; and
    control circuitry configured to:
    receive a request from an electronic device for secured access;
    in response to the request for secured access:
    generate a Completely Automated Public Turing test to tell Computers and Humans Apart (CAPTCHA) challenge for the electronic device, wherein the CAPTCHA challenge includes:
    using communications circuitry, causing display on the electronic device of a 3D virtual object having an occluded element, wherein the 3D virtual object is spatially anchored to an object located in a virtual or real environment; and
    using communications circuitry, delivering instructions to the electronic device to interact with the displayed 3D virtual object in order to reveal the occluded element of the 3D virtual object;
    receive a response identifying the occluded element of the 3D object from the electronic device; and
    determine whether to provide the secured access based on the received response.

12. The system of claim 11, further comprising the control circuitry configured to:

determine that the received response identifying the occluded element of the 3D object matches a predetermined response; and in response to the determination, providing the secured access.

13. The system of claim 11, further comprising, the control circuitry configured to:

monitor interactions with the displayed 3D virtual object by use of the electronic device;

determine whether the monitored interactions match the delivered instructions to interact with the displayed 3D virtual object; and in response to determining that the monitored interactions match the delivered instructions to interact with the displayed 3D virtual object:

reveal the occluded element of the 3D object.

14. The system of claim 11, further comprising the control circuitry configured to:

query the electronic device to verify the revealed occluded element;

receive the response identifying the occluded element of the 3D object, wherein the received response is in response to the query to the electronic device for verifying the revealed occluded element; and provide the secured access if the response to the query matches a predetermined answer.

15. The system of claim 11, wherein the delivered instructions instruct a user of the electronic device to displace the electronic device from a first location to a second location at which the occluded element is visible in a field of view of the electronic device.

16. The system of claim 11, wherein the instructions include any two or more of the following instructions:

a) instructions to a user of the electronic device to touch the 3D virtual object;

b) instructions to a user of the electronic device to interact with the 3D virtual object by performing one or more interactions using the 3D object;

c) instructions to displace the 3D object within a virtual environment to a location as instructed;

d) instructions to displace the 3D object within a virtual environment to a location based on user knowledge of the 3D object;

e) instructions to solve a challenge by using the 3D virtual object;

f) instructions to rotate the 3D virtual object; or g) instructions to shake the 3D virtual object or the electronic device.

17. The system of claim 11, further comprising, the control circuitry configured to:

display the 3D virtual object at a first depth from a user's eye in a virtual environment; and instruct a user of the electronic device to displace the displayed 3D virtual object to a second depth from the user's eye in the virtual environment, wherein the first depth is at a different depth perception from the second depth and the second depth is the 3D virtual object's designated resting place.

18. The system of claim 11, further comprising the control circuitry configured to:

track a location of the electronic device using the electronic device's GPS locator; and reveal the occluded element of the 3D virtual object if the location of the electronic device is within a threshold distance of a predetermined location.

19. The system of claim 11, wherein the delivered instructions are delivered by the control circuitry in any one or more of the following formats: a) audio instructions delivered through a speaker or earphones associated with the electronic device, b) a display on the electronic device, c) both audio and display instructions of options a) and b), or d) a pop-up display on the electronic device.

\* \* \* \* \*